United States Patent
Hwang et al.

(10) Patent No.: US 9,110,564 B2
(45) Date of Patent: Aug. 18, 2015

(54) MOBILE TERMINAL, METHOD FOR CONTROLLING MOBILE TERMINAL, AND METHOD FOR DISPLAYING IMAGE OF MOBILE TERMINAL

(75) Inventors: Soonjae Hwang, Seoul (KR); Yookyung Lim, Seoul (KR); Jungmin Lee, Seoul (KR); Younghoon Song, Seoul (KR); Juha Hyun, Seoul (KR)

(73) Assignee: LG Electronics Inc., Seoul (KR)

( * ) Notice: Subject to any disclaimer, the term of this patent is extended or adjusted under 35 U.S.C. 154(b) by 1070 days.

(21) Appl. No.: 13/083,877

(22) Filed: Apr. 11, 2011

(65) Prior Publication Data

US 2012/0113095 A1    May 10, 2012

(30) Foreign Application Priority Data

Nov. 5, 2010 (KR) .................. 10-2010-0109735
Nov. 5, 2010 (KR) .................. 10-2010-0109736

(51) Int. Cl.
| | | |
|---|---|---|
| G09G 5/00 | (2006.01) | |
| G06F 3/0481 | (2013.01) | |
| G09G 5/377 | (2006.01) | |
| G06F 3/0486 | (2013.01) | |
| G06F 3/0488 | (2013.01) | |

(52) U.S. Cl.
CPC .......... *G06F 3/04817* (2013.01); *G06F 3/0486* (2013.01); *G06F 3/0488* (2013.01); *G09G 5/377* (2013.01); *G06F 2203/04101* (2013.01); *G06F 2203/04802* (2013.01); *G06F 2203/04804* (2013.01); *G09G 2340/12* (2013.01)

(58) Field of Classification Search
USPC .......................................... 345/629; 715/711
See application file for complete search history.

(56) References Cited

U.S. PATENT DOCUMENTS

| | | | |
|---|---|---|---|
| 6,243,054 | B1 | 6/2001 | DeLuca |
| 6,559,813 | B1 | 5/2003 | DeLuca et al. |
| 6,577,330 | B1 | 6/2003 | Tsuda et al. |
| 2006/0090169 | A1 | 4/2006 | Daniels et al. |
| 2007/0245256 | A1 | 10/2007 | Boss et al. |
| 2010/0079405 | A1 | 4/2010 | Bernstein |
| 2013/0104061 | A1 | 4/2013 | Engel et al. |

FOREIGN PATENT DOCUMENTS

| | | |
|---|---|---|
| CN | 1274439 A | 11/2000 |
| CN | 1809863 A | 7/2006 |
| CN | 101452366 A | 6/2009 |

*Primary Examiner* — David Zarka
*Assistant Examiner* — Robert Craddock
(74) *Attorney, Agent, or Firm* — Birch, Stewart, Kolasch & Birch, LLP

(57) ABSTRACT

A mobile terminal including a wireless communication unit configured to wirelessly communicate with at least one other terminal; a display unit configured to display at least a 2D (two-dimensional) object and a 3D (three-dimensional) object; and a controller configured to control the display unit to display the 2D object and the 3D object in an overlapping manner, and to change a display characteristic of at least one of the overlapping 2D object and the 3D object.

22 Claims, 32 Drawing Sheets

MOBILE TERMINAL, METHOD FOR CONTROLLING MOBILE TERMINAL, AND METHOD FOR DISPLAYING IMAGE OF MOBILE TERMINAL

BACKGROUND OF THE INVENTION

1. Field of the Invention

The present invention relates to a mobile terminal and corresponding method for controlling a plurality of overlapping objects in various manners and providing various user interfaces for executing corresponding applications.

2. Description of the Related Art

A mobile terminal is a device which may be configured to perform various functions. Examples of such functions include data and voice communications, capturing images and video via a camera, recording audio, playing music files via a speaker system, and displaying images and video on a display. Some terminals include additional functionality which supports game playing, while other terminals are configured as multimedia players. In addition, mobile terminals can also receive broadcast and multicast signals, which permit viewing of content such as videos and television programs.

In addition, the functions of the mobile terminal continue to increase, and the user interfaces for handling the variety of functions have become more complex. The operation of the complex user interface is sometimes cumbersome and time consuming for users, especially users who are not familiar with the many functions provided on the mobile terminal.

SUMMARY OF THE INVENTION

Accordingly, one object of the present invention is to address the above-noted and other problems of the related art mobile terminal.

Another object of the present invention is to provide a novel mobile terminal and corresponding method for controlling a plurality of overlapping objects.

Still another object of the present invention is to provide a mobile terminal and corresponding method for controlling a particular object among a plurality of objects in various manners when update information related to the particular object is received when the plurality of objects are displayed in an overlapping manner.

Yet another object of the present invention is to provide a mobile terminal user interface for effectively accessing a plurality of objects displayed in an overlapping manner.

Another object of the present invention is to provide various mobile terminal user interfaces for executing an application corresponding to at least one of a plurality of objects.

To achieve these and other advantages and in accordance with the purpose of the present invention, as embodied and broadly described herein, the present invention provides in one aspect a mobile terminal including a wireless communication unit configured to wirelessly communicate with at least one other terminal; a display unit configured to display at least a 2D (two-dimensional) object and a 3D (three-dimensional) object; and a controller configured to control the display unit to display the 2D object and the 3D object in an overlapping manner, and to change a display characteristic of at least one of the overlapping 2D object and the 3D object.

In another aspect, the present invention provides a method of controlling a mobile terminal, and which includes allowing, via a wireless communication unit included on the mobile terminal, wireless communication with at least one other terminal; displaying, via a display unit included on the mobile terminal, at least a 2D (two-dimensional) object and a 3D (three-dimensional) object in an overlapping manner; and changing, via a controller included on the mobile terminal, a display characteristic of at least one of the overlapping 2D object and the 3D object.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

[change description of figures later]

Figure 19:
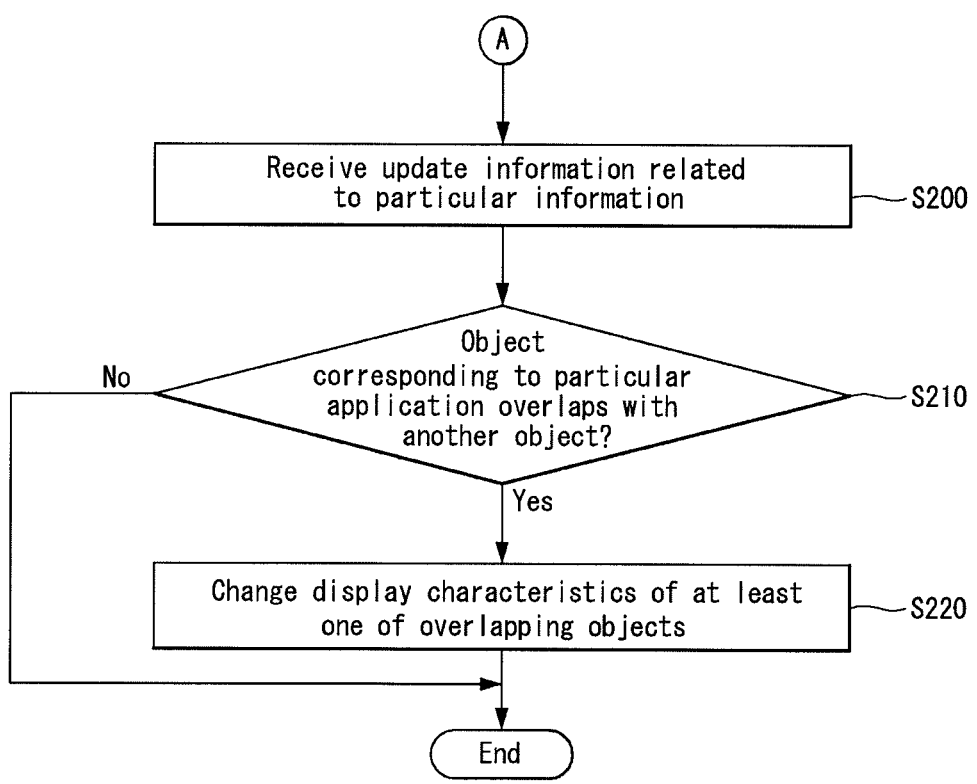
Figure 20:
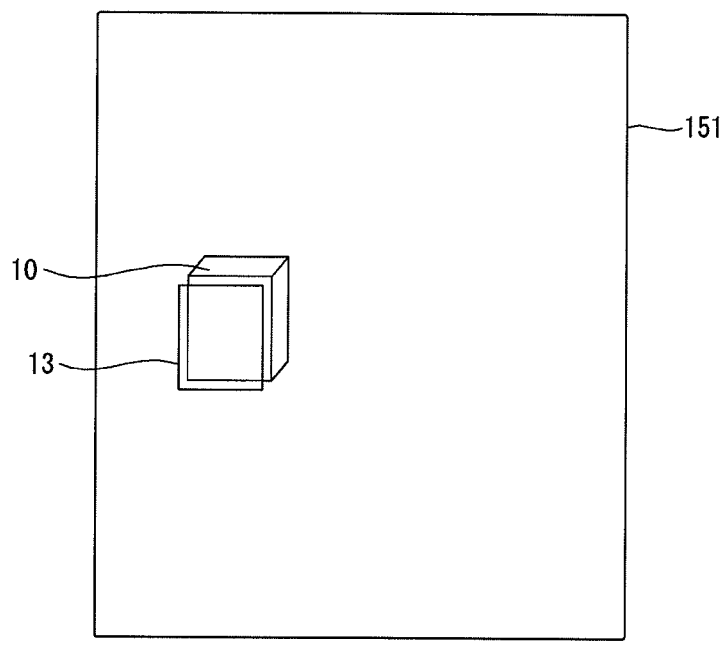
Figure 21:
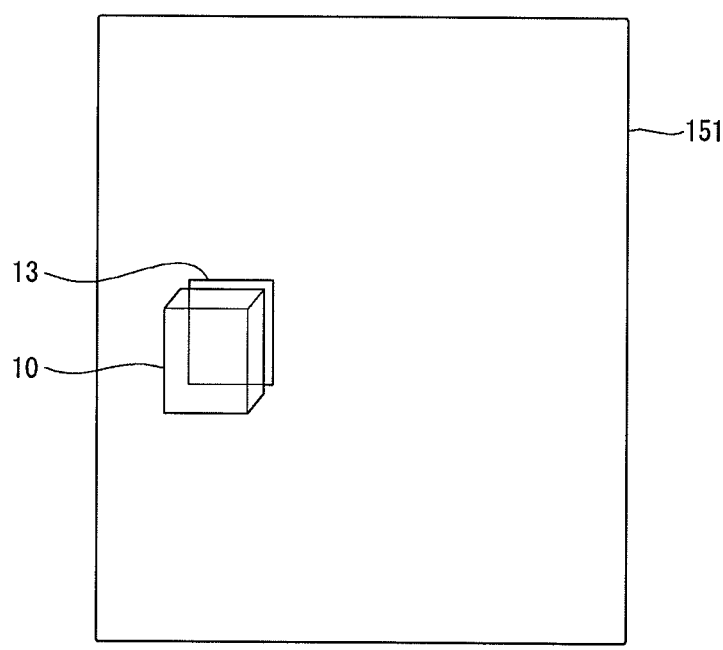
Figure 22:
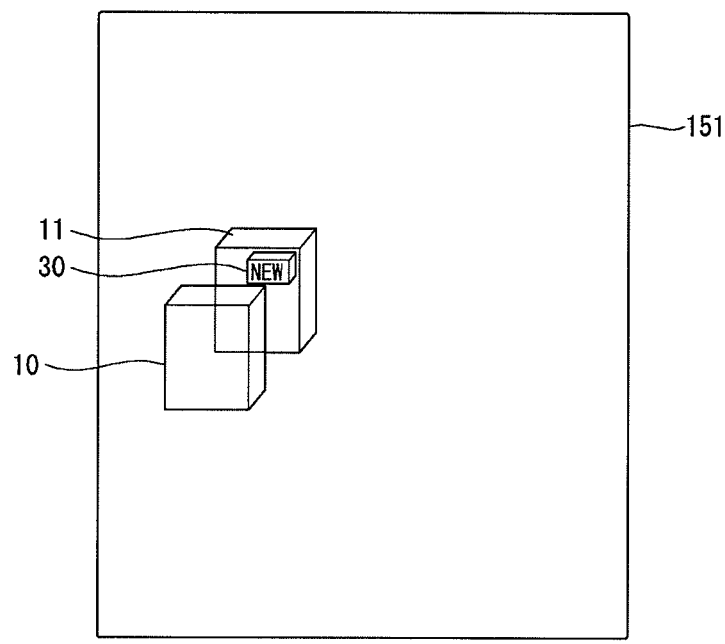
Figure 23:
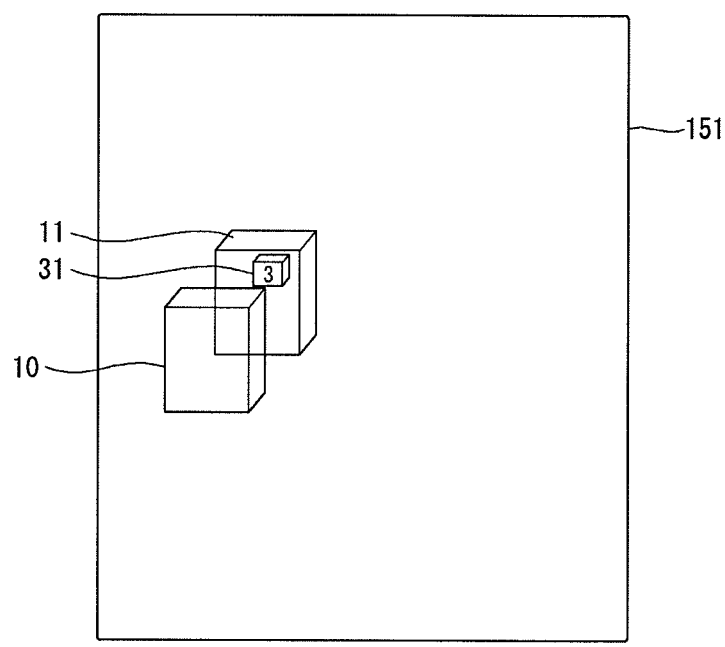
Figure 24:
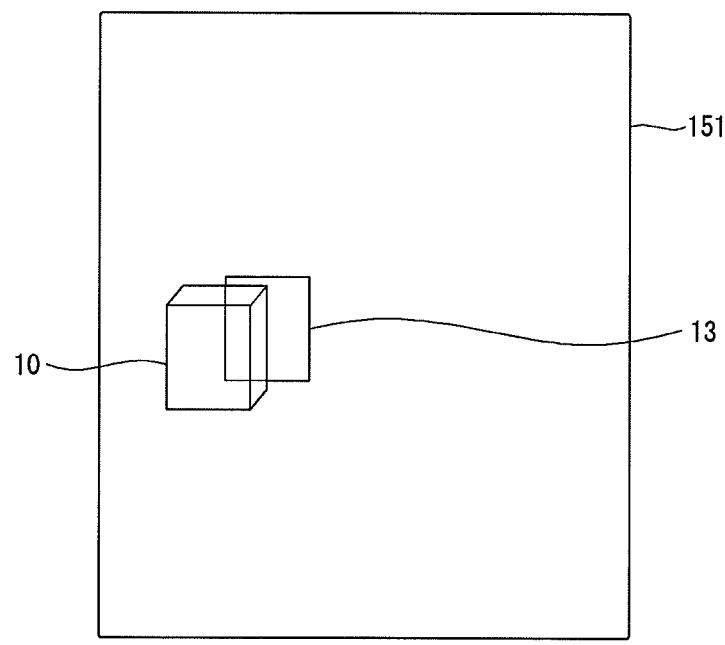
Figure 25:
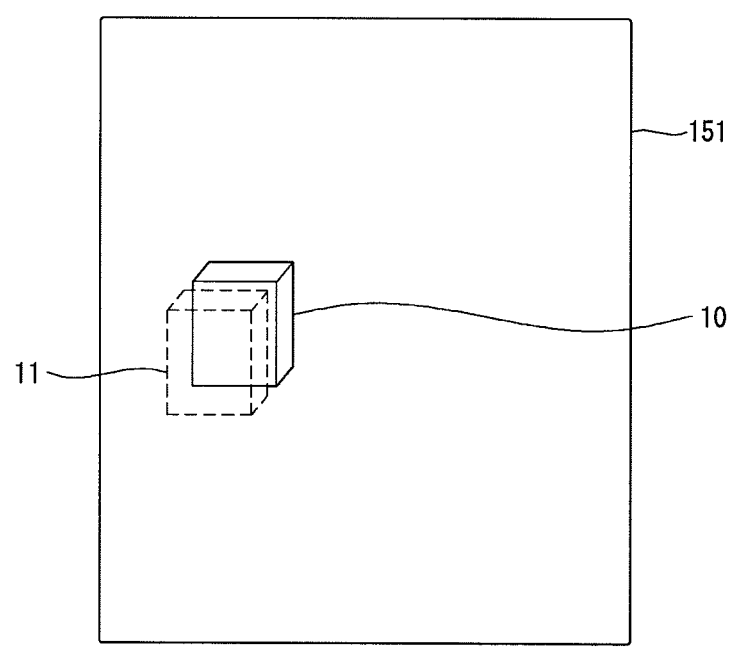
Figure 26:
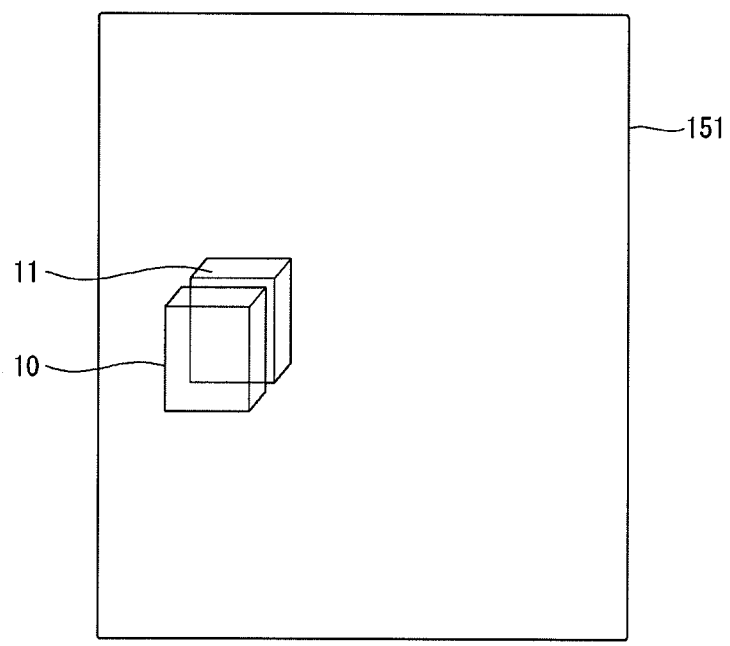
Figure 27:
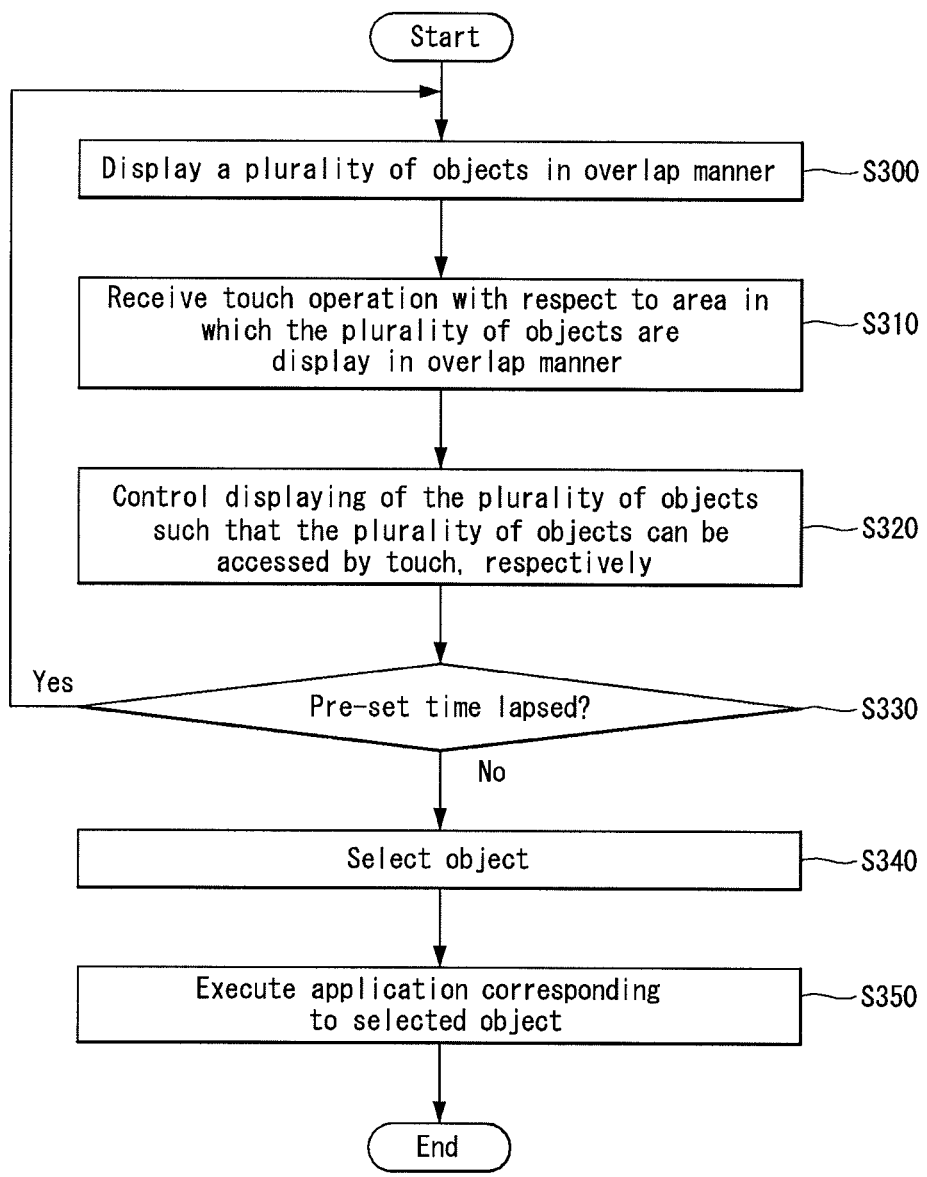
Figure 28:
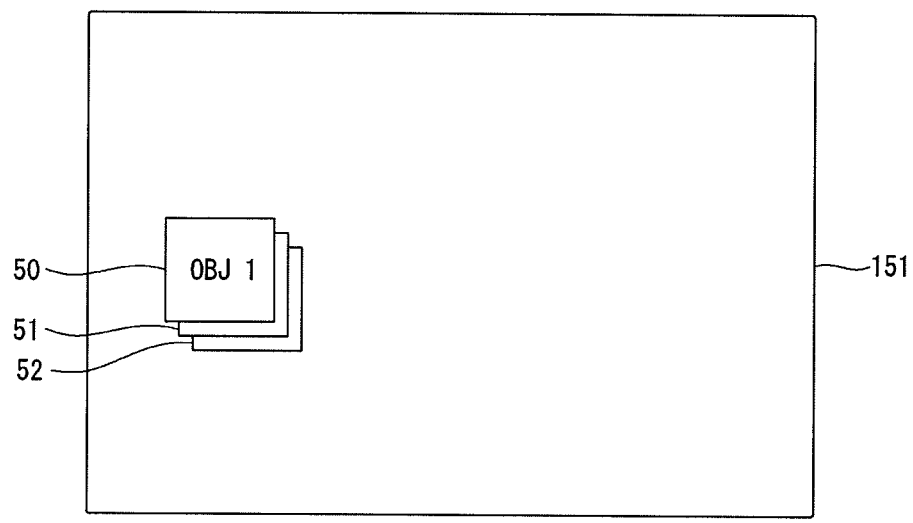
Figure 29:
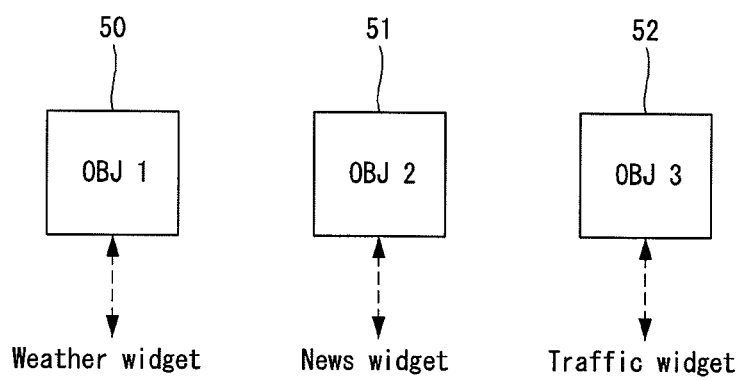
Figure 30:
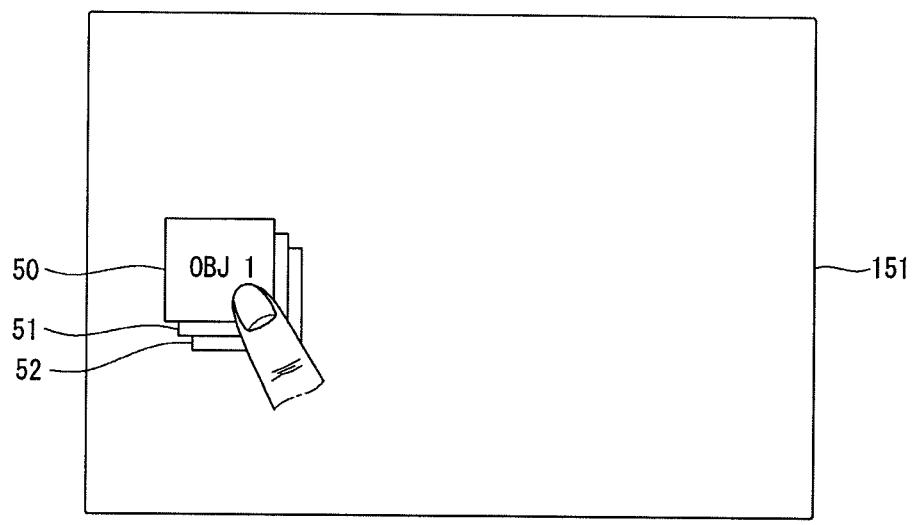
Figure 31:
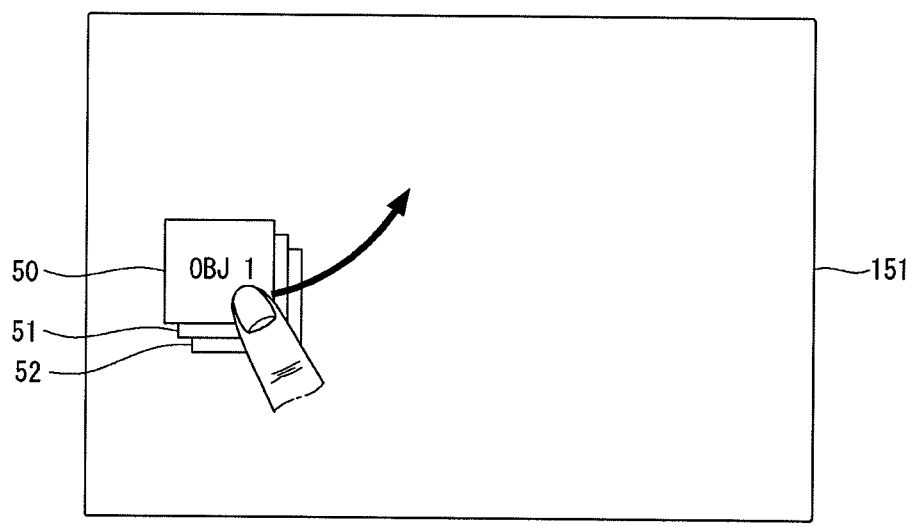
Figure 32:
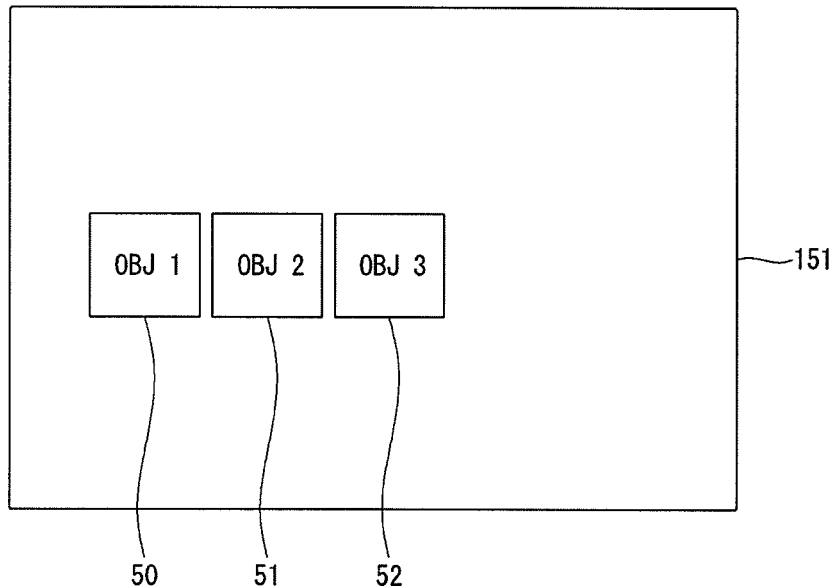
Figure 33:
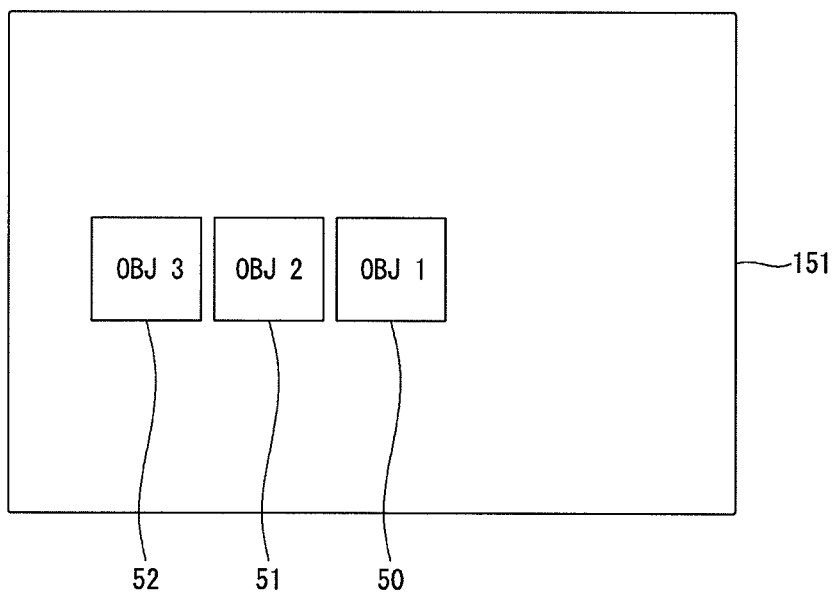
Figure 34:
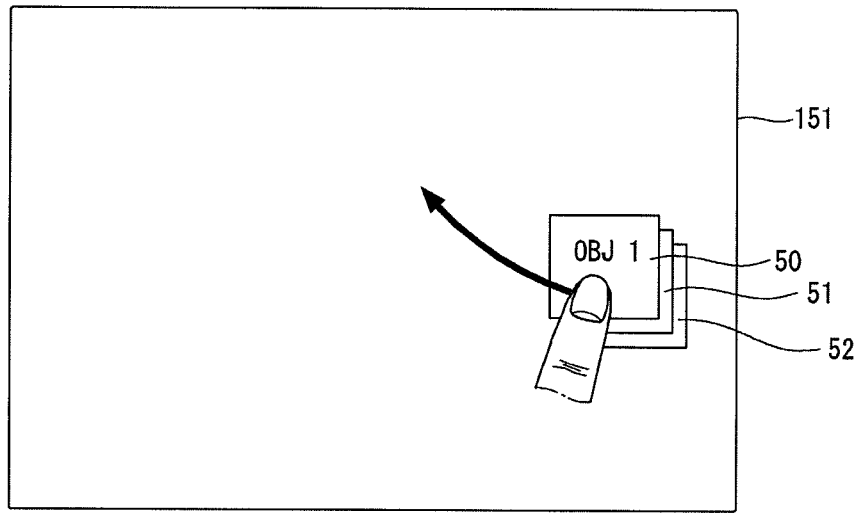
Figure 35:
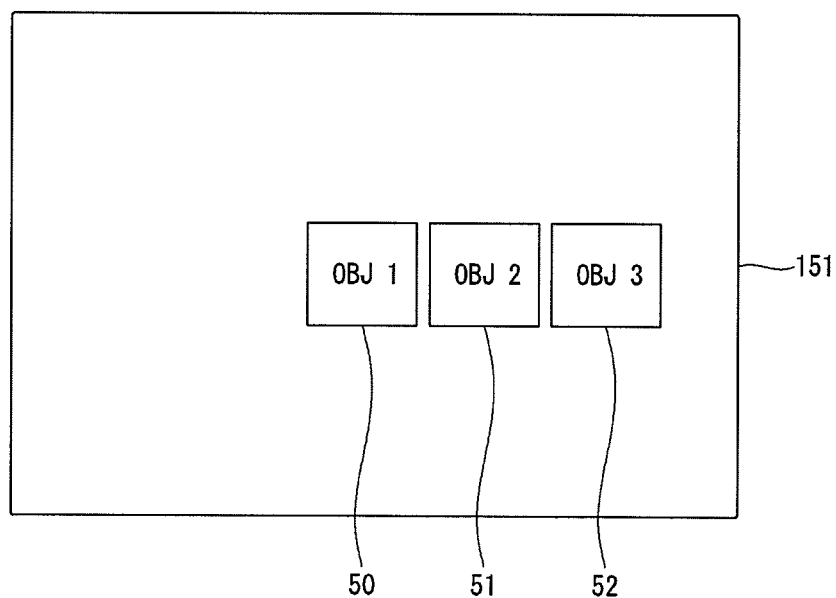
Figure 36:
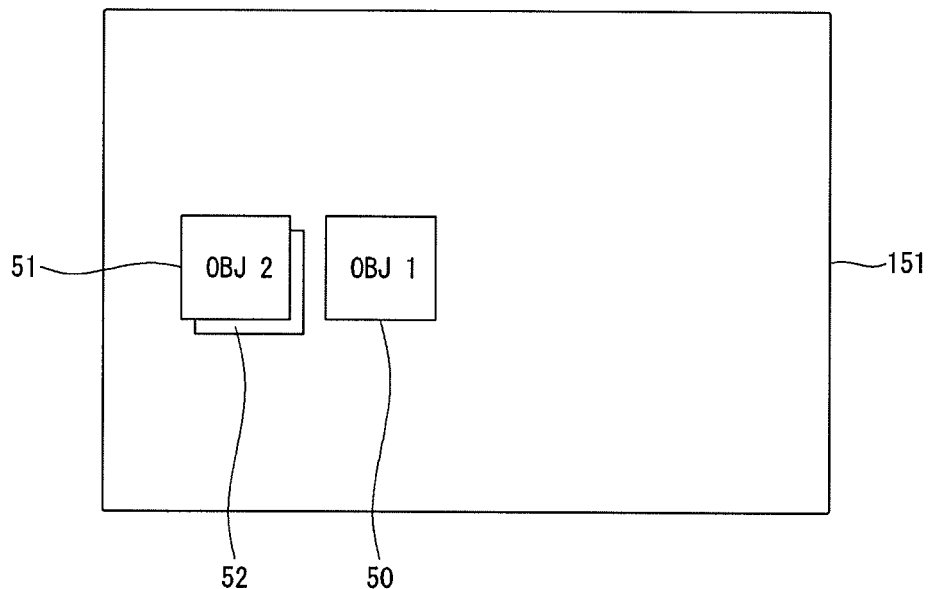
Figure 37:
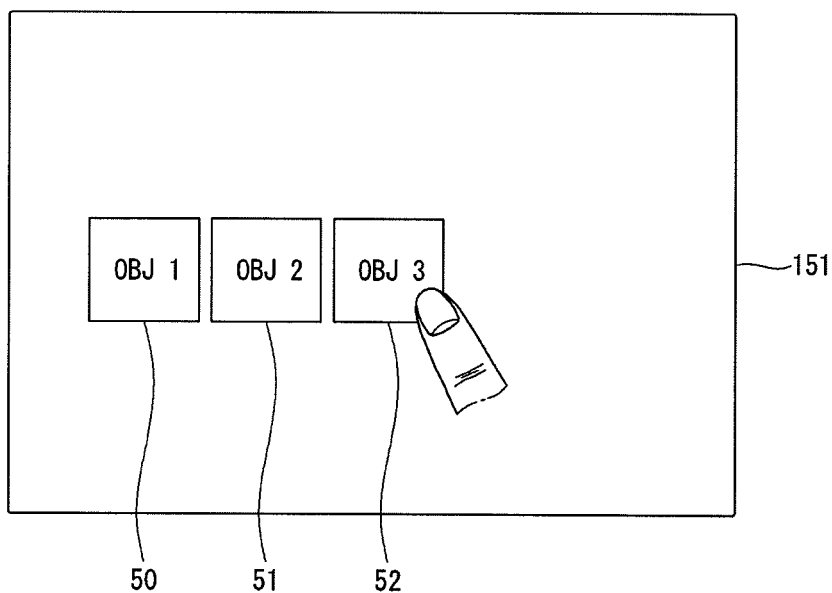
Figure 38:
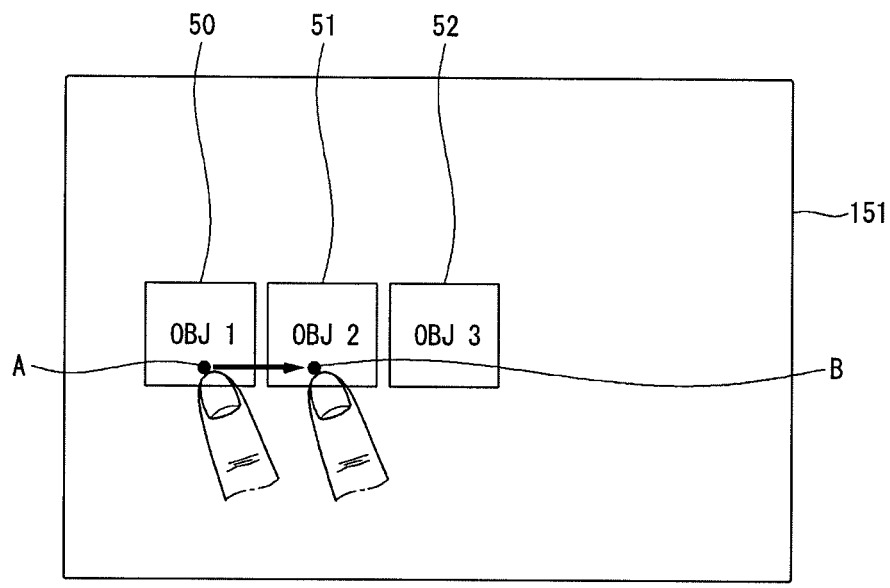
Figure 39:
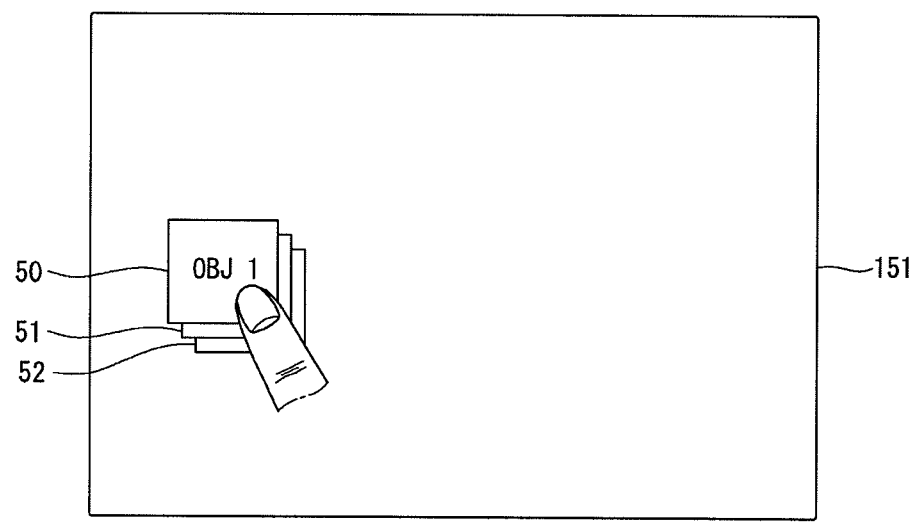
Figure 43:
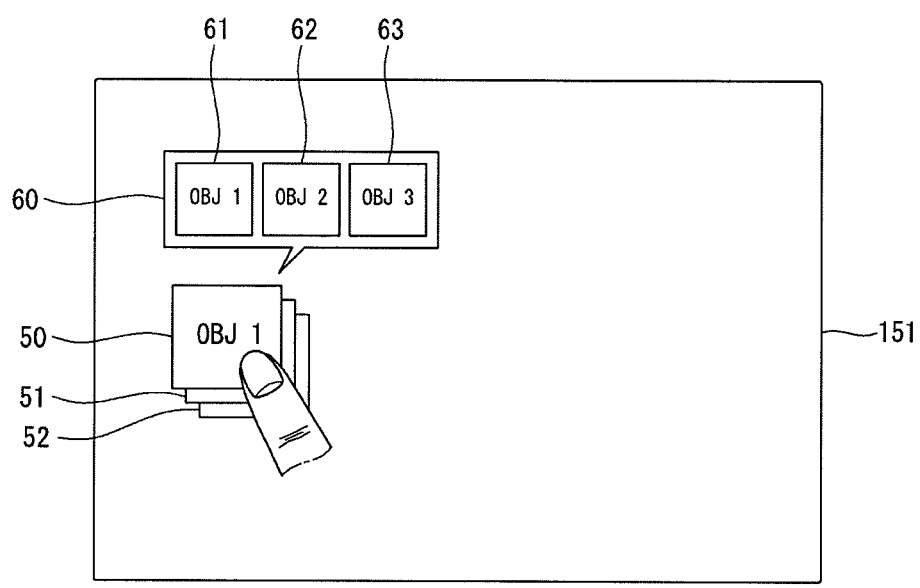
Figure 44:
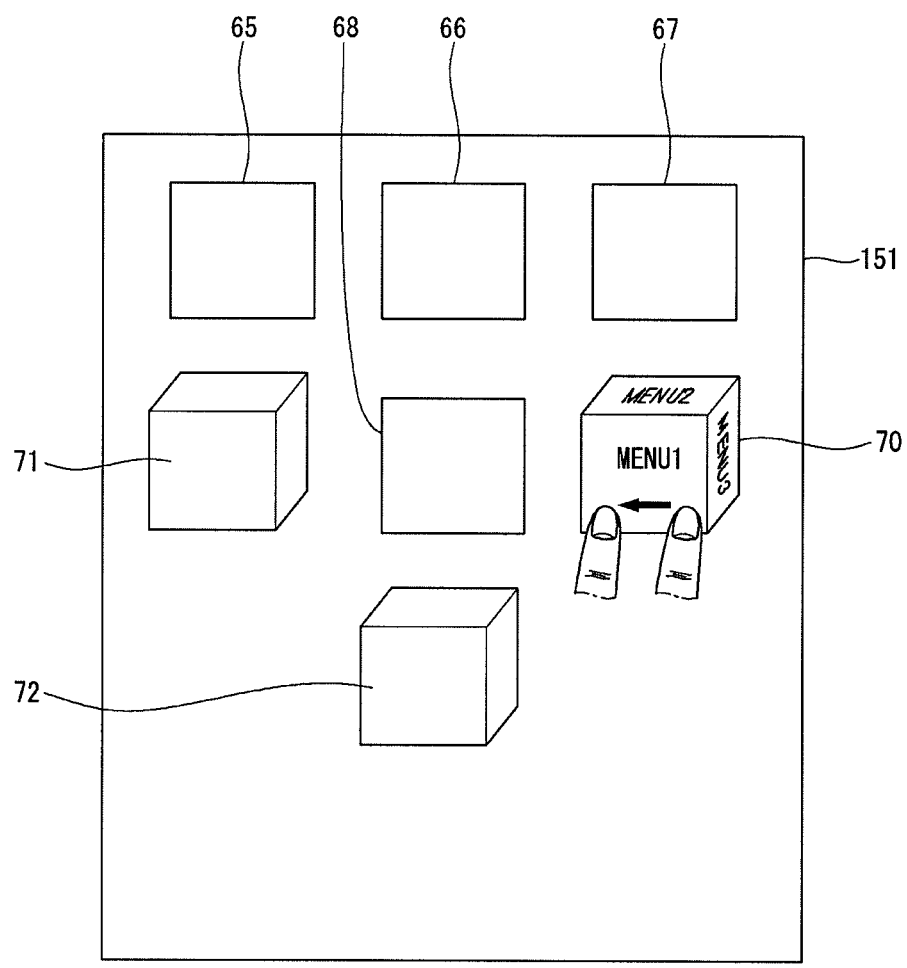
Figure 45:
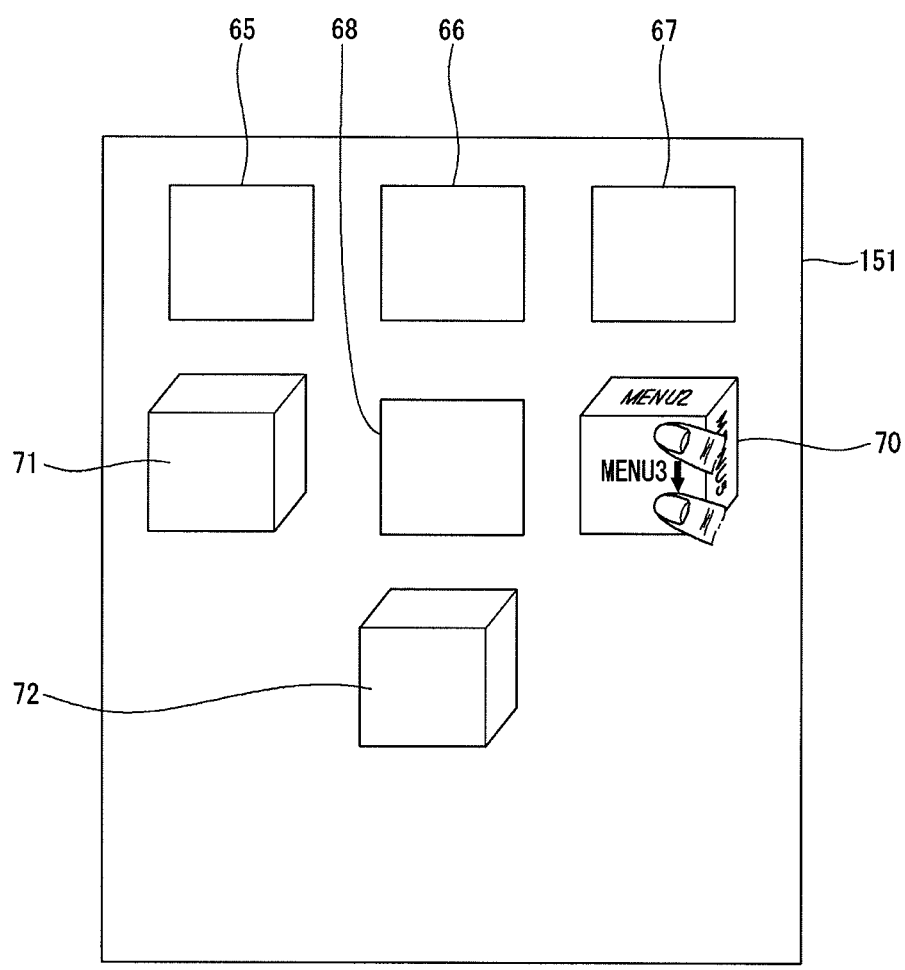
Figure 46:
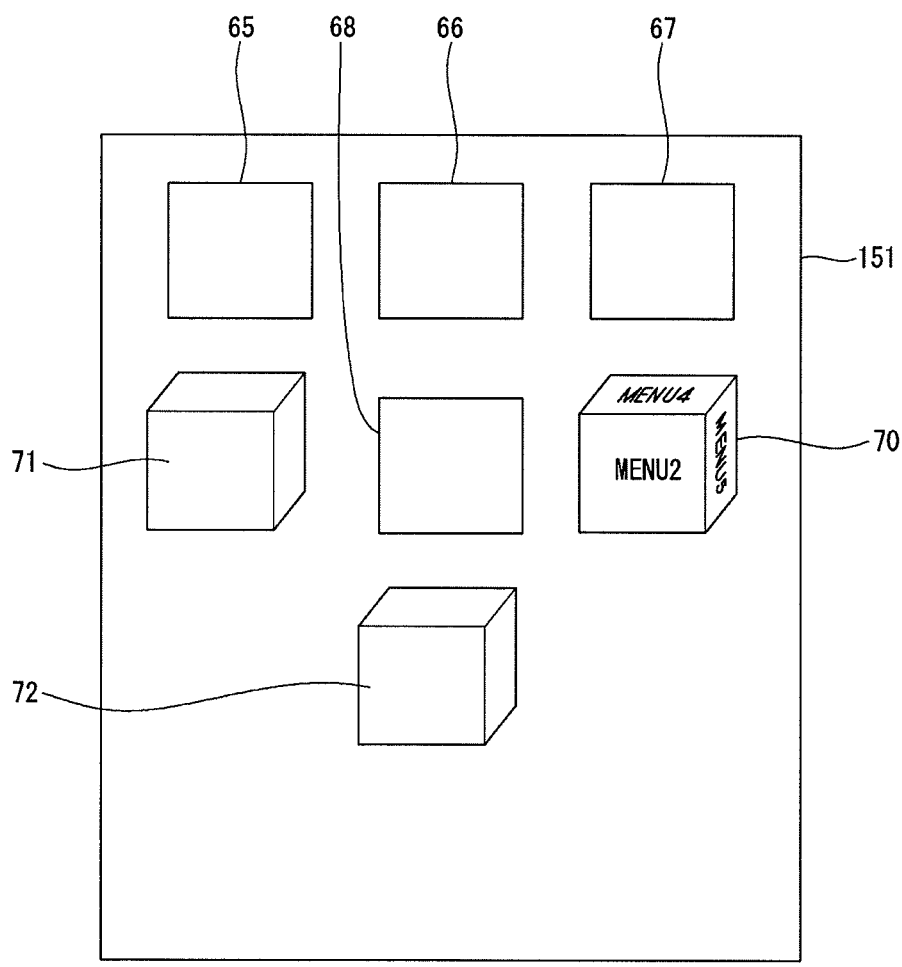
Figure 47:
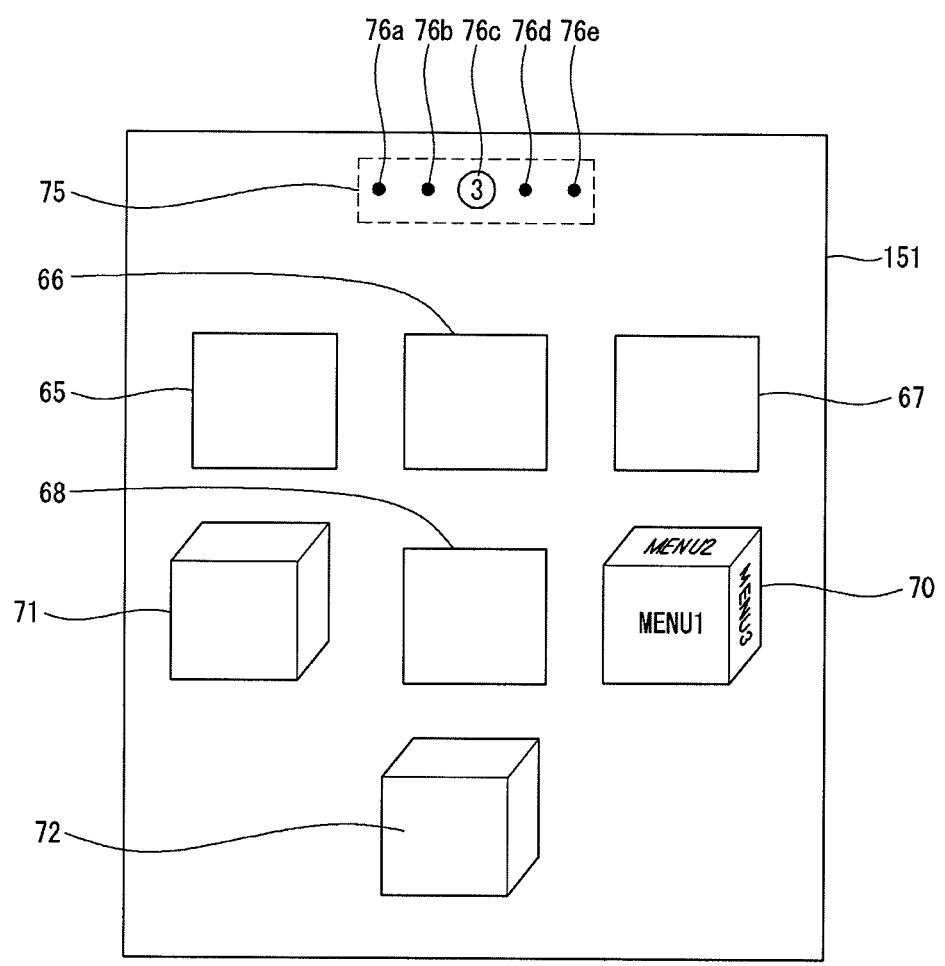
Figure 48:
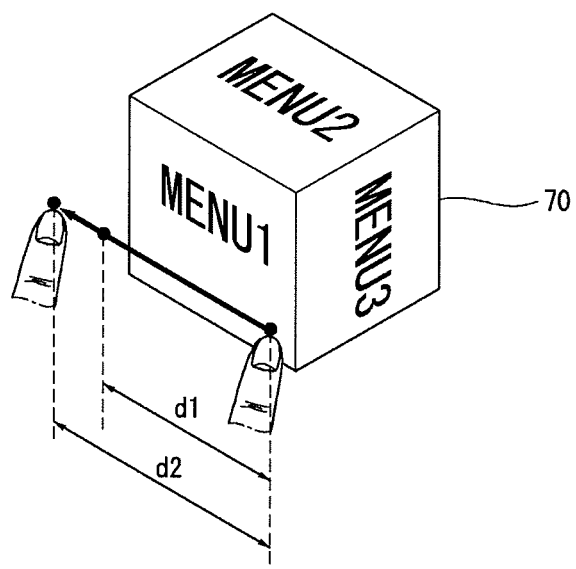
Figure 49:
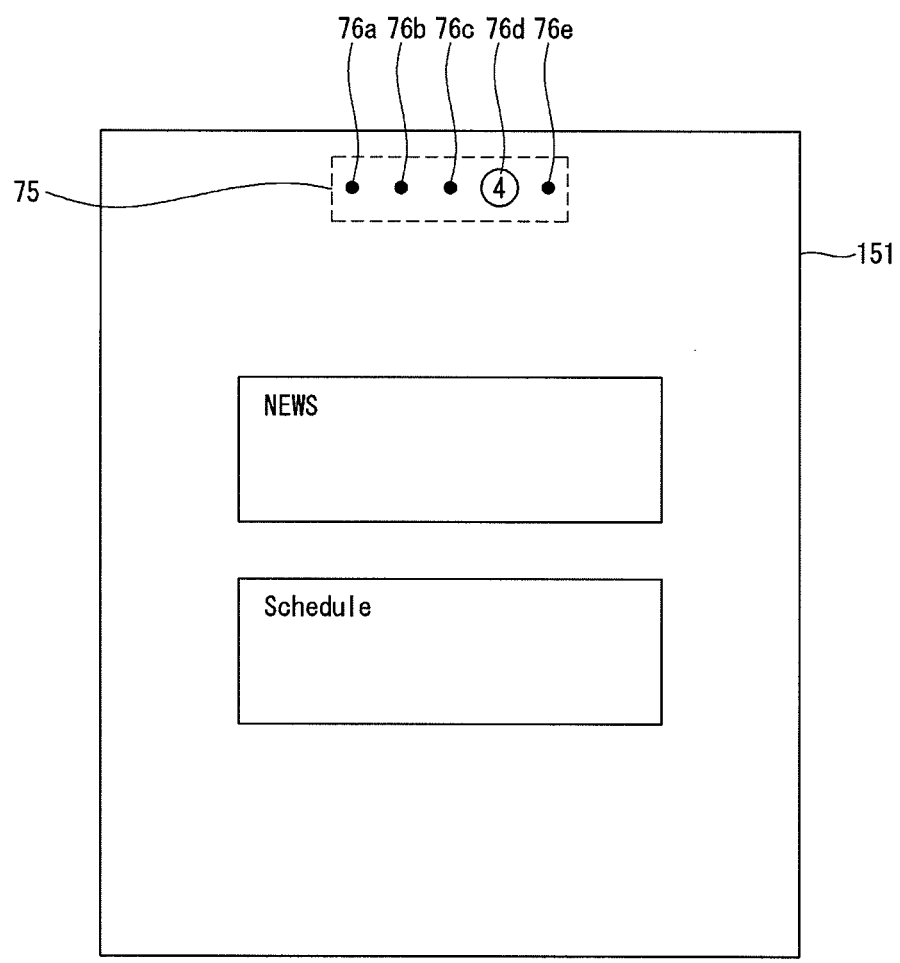
Figure 50:
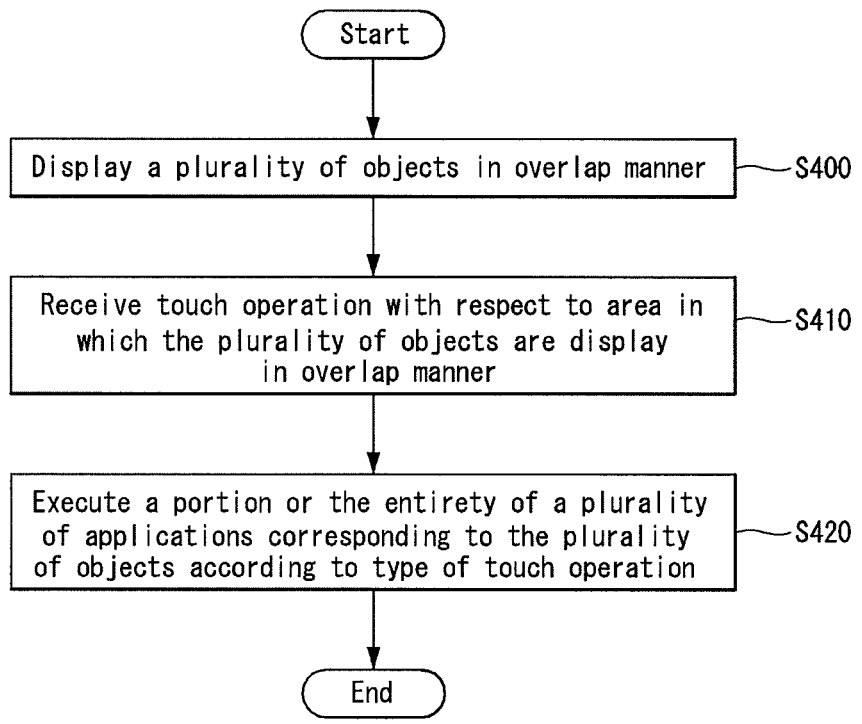

FIG. 19 is a flow chart illustrating a method for displaying an image of a mobile terminal according to a second embodiment of the present invention;

FIGS. 20 and 21 are overviews illustrating a change in the display characteristics of an object based on reception of update information for a depth level changing scheme according to an embodiment of the present invention;

FIGS. 22 and 23 are overviews illustrating a change in the display characteristics of an object based on reception of the update information according to providing of a 3D indicator according to an embodiment of the present invention;

FIG. 24 is an overview illustrating a change in display characteristics of an object according to received update information according to a change in the position of an object;

FIGS. 25 and 26 are views illustrating examples of controlling the display characteristics differently according to first and second update information;

FIG. 27 is a flow chart illustrating the process of a method for displaying an image of a mobile terminal according to a first exemplary embodiment of the present invention;

FIG. 28 is a view illustrating a plurality of objects displayed in an overlap manner on a touch screen 151;

FIG. 29 is a view illustrating examples of widgets to which first to third objects 50, 51, and 52 correspond;

FIGS. 30 and 31 are views illustrating examples of performing a step S310;

FIGS. 32 and 33 are views illustrating examples of a step S320 according to a touch operation performed in FIG. 30 or FIG. 31;

FIGS. 34 and 35 are views illustrating another example of steps S310 and S320 performed according to a stroke operation;

FIG. 36 is a view illustrating an example in which the degree of unfolding a plurality of objects varies according to at least one of the distance and speed of the stroke operation;

FIGS. 37 and 38 are views illustrating examples of touch operations to execute an application corresponding to a particular object among the plurality of objects;

FIGS. 39 and to 42 are views illustrating examples of performing steps S310 and S320 in relation to rolling of the plurality of objects;

FIG. 43 is a view illustrating an example of performing the steps S310 and S320 in relation to a pop-up window;

FIGS. 44 to 46 are views illustrating examples of performing the steps S310 and S320 when the plurality of objects are formed as a polyhedron;

FIG. 47 is a view illustrating an example of providing a plurality of home screens;

FIGS. 48 and 49 are views illustrating performing of a function according to a stroke operation with respect to polyhedrons when a plurality of home screens are provided; and FIG. 50 is a flow chart illustrating the process of a method for controlling a mobile terminal according to a fourth exemplary embodiment of the present invention.

DETAILED DESCRIPTION OF THE INVENTION

Reference will now be made in detail to the preferred embodiments of the present invention, examples of which are illustrated in the accompanying drawings.

The mobile terminal described in the present invention includes, for example, mobile phones, smart phones, computers, notebook computers, digital broadcasting terminals, PDAs (Personal Digital Assistants), PMPs (Portable Multimedia Player), navigation devices, and the like.

Figure 1:
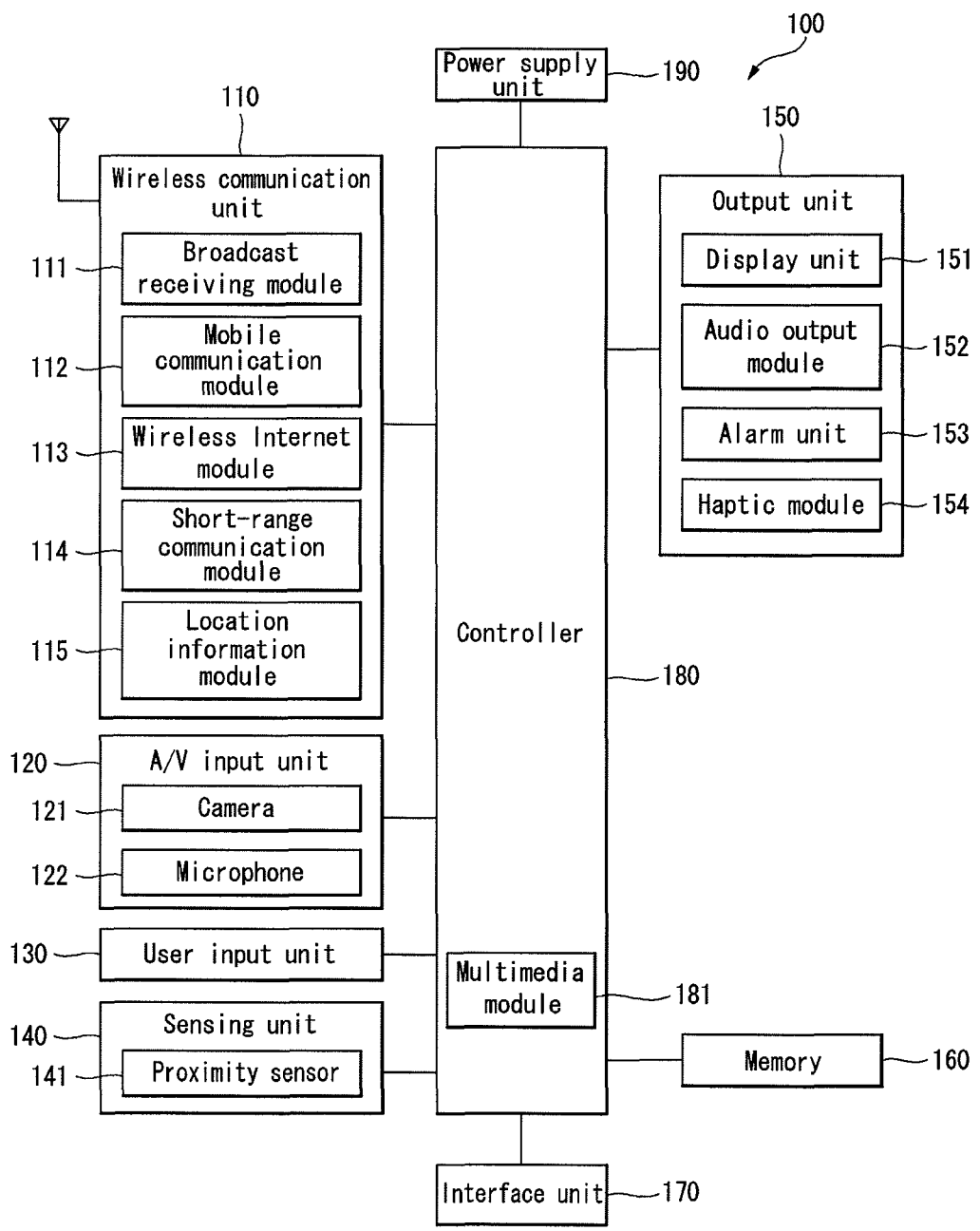
FIG. 1 is a block diagram of a mobile terminal according to an embodiment of the present invention.

FIG. 1 is a block diagram of a mobile terminal 100 according to an embodiment of the present invention. As shown, the mobile terminal 100 includes a wireless communication unit 110, an A/V (Audio/Video) input unit 120, a user input unit 130, a sensing unit 140, an output unit 150, a memory 160, an interface unit 170, a controller 180, and a power supply unit 190, etc. FIG. 1 shows the mobile terminal as having various components, but implementing all of the illustrated components is not a requirement. Greater or fewer components may alternatively be implemented.

In addition, the wireless communication unit 110 generally includes one or more components allowing radio communication between the mobile terminal 100 and a wireless communication system or a network in which the mobile terminal is located. For example, in FIG. 1, the wireless communication unit includes at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server via a broadcast channel. Further, the broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

In addition, the broadcast associated information may refer to information associated with a broadcast channel, a broadcast program or a broadcast service provider. The broadcast associated information may also be provided via a mobile communication network and, in this instance, the broadcast associated information may be received by the mobile communication module 112.

Further, the broadcast signal may exist in various forms. For example, the broadcast signal may exist in the form of an electronic program guide (EPG) of the digital multimedia broadcasting (DMB) system, and electronic service guide (ESG) of the digital video broadcast-handheld (DVB-H) system, and the like.

The broadcast receiving module 111 may also be configured to receive signals broadcast by using various types of broadcast systems. In particular, the broadcast receiving module 111 can receive a digital broadcast using a digital broadcast system such as the multimedia broadcasting-terrestrial (DMB-T) system, the digital multimedia broadcasting-satellite (DMB-S) system, the digital video broadcast-handheld (DVB-H) system, the data broadcasting system known as the media forward link only (MediaFLO®), the integrated services digital broadcast-terrestrial (ISDB-T) system, etc.

The broadcast receiving module 111 can also be configured to be suitable for all broadcast systems that provide a broadcast signal as well as the above-mentioned digital broadcast systems. In addition, the broadcast signals and/or broadcast-associated information received via the broadcast receiving module 111 may be stored in the memory 160.

In addition, the mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The wireless Internet module 113 supports wireless Internet access for the mobile terminal and may be internally or externally coupled to the terminal. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

Further, the short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

Also, the location information module 115 is a module for checking or acquiring a location or position of the mobile terminal. The location information module 115 may acquire location information by using a global navigation satellite system (GNSS). Here, the GNSS is a standard generic term for satellite navigation systems revolving around the earth and allowing certain types of radio navigation receivers to transmit reference signals determining their location on or in the vicinity of the surface of the earth. The GNSS may include the United States' global positioning system (GPS), the European Union's Galileo positioning system, the Russian global orbiting navigational satellite system (GLONASS), COMPASS, a compass navigation system, by the People's Republic of China, and the quasi-zenith satellite system (QZSS) by Japan.

An example of GNSS is a GPS (Global Positioning System) module. The GPS module may calculate information related to the distance from one point (entity) to three or more satellites and information related to time at which the distance information was measured, and applies trigonometry to the calculated distance, thereby calculating three-dimensional location information according to latitude, longitude, and altitude with respect to the one point (entity). In addition, a method of acquiring location and time information by using three satellites and correcting an error of the calculated location and time information by using another one satellite may be also used. The GPS module may also continuously calculate the current location in real time and also calculate speed information by using the continuously calculated current location.

With reference to FIG. 1, the A/V input unit 120 is configured to receive an audio or video signal, and includes a camera 121 and a microphone 122. The camera 121 processes image data of still pictures or video obtained by an image capture device in a video capturing mode or an image capturing mode, and the processed image frames can then be displayed on a display unit 151.

Further, the image frames processed by the camera 121 may be stored in the memory 160 or transmitted via the wireless communication unit 110. Two or more cameras 121 may also be provided according to the configuration of the mobile terminal.

In addition, the microphone 122 can receive sounds via a microphone in a phone call mode, a recording mode, a voice recognition mode, and the like, and can process such sounds into audio data. The processed audio data may then be converted for output into a format transmittable to a mobile communication base station via the mobile communication module 112 for the phone call mode. The microphone 122 may also implement various types of noise canceling (or suppression) algorithms to cancel or suppress noise or interference generated when receiving and transmitting audio signals.

Also, the user input unit 130 can generate input data from commands entered by a user to control various operations of the mobile terminal. The user input unit 130 may include a keypad, a dome switch, a touch pad (e.g., a touch sensitive member that detects changes in resistance, pressure, capacitance, etc. due to being contacted), a jog wheel, a jog switch, and the like.

Further, the sensing unit 140 detects a current status of the mobile terminal 100 such as an opened or closed state of the mobile terminal 100, a location of the mobile terminal 100, the presence or absence of user contact with the mobile terminal 100, the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. In FIG. 1, the sensing unit 140 also includes a proximity sensor 141.

In addition, the output unit 150 is configured to provide outputs in a visual, audible, and/or tactile manner. In the example in FIG. 1, the output unit 150 includes the display unit 151, an audio output module 152, an alarm unit 153, a haptic module 154, and the like. In more detail, the display unit 151 can display information processed in the mobile terminal 100. For example, when the mobile terminal 100 is in a phone call mode, the display unit 151 can display a User Interface (UI) or a Graphic User Interface (GUI) associated with a call or other communication.

The display unit 151 may also include at least one of a Liquid Crystal Display (LCD), a Thin Film Transistor-LCD (TFT-LCD), an Organic Light Emitting Diode (OLED) display, a flexible display, a three-dimensional (3D) display, or the like. Some of these displays may also be configured to be transparent or light-transmissive to allow for viewing of the exterior, which is called transparent displays.

An example transparent display is a TOLED (Transparent Organic Light Emitting Diode) display, or the like. A rear structure of the display unit 151 may be also light-transmissive. Through such configuration, the user can view an object positioned at the rear side of the terminal body through the region occupied by the display unit 151 of the terminal body.

Further, the mobile terminal 100 may include two or more display units according to its particular desired embodiment. For example, a plurality of display units may be separately or integrally disposed on one surface of the mobile terminal, or may be separately disposed on mutually different surfaces.

Meanwhile, when the display unit 151 and a sensor (referred to as a 'touch sensor', hereinafter) for detecting a touch operation are overlaid in a layered manner to form a touch screen, the display unit 151 can function as both an input device and an output device. The touch sensor may have a form of a touch film, a touch sheet, a touch pad, and the like.

Further, the touch sensor may be configured to convert pressure applied to a particular portion of the display unit 151 or a change in the capacitance or the like generated at a particular portion of the display unit 151 into an electrical input signal. The touch sensor may also be configured to detect the pressure when a touch is applied, as well as the touched position and area.

When there is a touch input with respect to the touch sensor, corresponding signals are transmitted to a touch controller, and the touch controller processes the signals and transmits corresponding data to the controller 180. Accordingly, the controller 180 can recognize which portion of the display unit 151 has been touched.

With reference to FIG. 1, the proximity sensor 141 may be disposed within or near the touch screen. in more detail, the proximity sensor 141 is a sensor for detecting the presence or absence of an object relative to a certain detection surface or an object that exists nearby by using the force of electromagnetism or infrared rays without a physical contact. Thus, the proximity sensor 141 has a considerably longer life span compared with a contact type sensor, and can be utilized for various purposes.

Examples of the proximity sensor 141 include a transmission type photoelectric sensor, a direct reflection type photoelectric sensor, a mirror-reflection type photo sensor, an RF oscillation type proximity sensor, a capacitance type proximity sensor, a magnetic proximity sensor, an infrared proximity sensor, and the like. When the touch screen is the capacitance type, proximity of the pointer is detected by a change in electric field according to the proximity of the pointer. In this instance, the touch screen (touch sensor) may be classified as a proximity sensor.

In the following description, for the sake of brevity, recognition of the pointer positioned to be close to the touch screen will be called a 'proximity touch', while recognition of actual contacting of the pointer on the touch screen will be called a 'contact touch'. Further, when the pointer is in the state of the proximity touch, it means that the pointer is positioned to correspond vertically to the touch screen.

By employing the proximity sensor 141, a proximity touch and a proximity touch pattern (e.g., a proximity touch distance, a proximity touch speed, a proximity touch time, a proximity touch position, a proximity touch movement state, or the like) can be detected, and information corresponding to the detected proximity touch operation and the proximity touch pattern can be output to the touch screen.

Further, the audio output module 152 can convert and output as sound audio data received from the wireless communication unit 110 or stored in the memory 160 in a call signal reception mode, a call mode, a record mode, a voice recognition mode, a broadcast reception mode, and the like. Also, the audio output module 152 can provide audible outputs related to a particular function performed by the mobile terminal 100 (e.g., a call signal reception sound, a message reception sound, etc.). The audio output module 152 may also include a speaker, a buzzer, or the like. In addition, the audio output module 152 may output a sound through an earphone jack.

In addition, the alarm unit 153 can output information about the occurrence of an event of the mobile terminal 100. Typical events include call reception, message reception, key signal inputs, a touch input etc. In addition to audio or video outputs, the alarm unit 153 can provide outputs in a different manner to inform about the occurrence of an event. For example, the alarm unit 153 can provide an output in the form of vibrations. The video signal or the audio signal may be also output through the display unit 151 or the audio output module 152.

In addition, the haptic module 154 generates various tactile effects the user may feel. One example of the tactile effects generated by the haptic module 154 is vibration. The strength and pattern of the haptic module 154 can also be controlled. For example, different vibrations may be combined to be output or sequentially output.

Besides vibration, the haptic module 154 can generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may also be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

Further, the memory 160 can store software programs used for the processing and controlling operations performed by the controller 180, or temporarily store data (e.g., a phonebook, messages, still images, video, etc.) that are input or output. In addition, the memory 160 may store data regarding various patterns of vibrations and audio signals output when a touch is input to the touch screen.

The memory 160 may also include at least one type of storage medium including a flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

Also, the interface unit 170 serves as an interface with external devices connected with the mobile terminal 100. For example, the external devices can transmit data to an external device, receive and transmit power to each element of the mobile terminal 100, or transmit internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may also be a chip that stores various types of information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device can be connected with the mobile terminal 100 via a port.

When the mobile terminal 100 is connected with an external cradle, the interface unit 170 can also serve as a passage to allow power from the cradle to be supplied therethrough to the mobile terminal 100 or serve as a passage to allow various command signals input by the user from the cradle to be transferred to the mobile terminal therethrough. Various command signals or power input from the cradle may operate as signals for recognizing that the mobile terminal is properly mounted on the cradle.

In addition, the controller 180 controls the general operations of the mobile terminal. For example, the controller 180 performs controlling and processing associated with voice calls, data communications, video calls, and the like. In the example in FIG. 1, the controller 180 also includes a multimedia module 181 for reproducing multimedia data. The multimedia module 181 may be configured within the controller 180 or may be configured to be separated from the controller 180. The controller 180 can also perform a pattern recognition processing to recognize a handwriting input or a picture drawing input performed on the touch screen as characters or images, respectively.

Also, the power supply unit 190 receives external power or internal power and supplies appropriate power required for operating respective elements and components under the control of the controller 180. Further, various embodiments described herein may be implemented in a computer-readable or its similar medium using, for example, software, hardware, or any combination thereof.

For a hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For a software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

Figure 2:
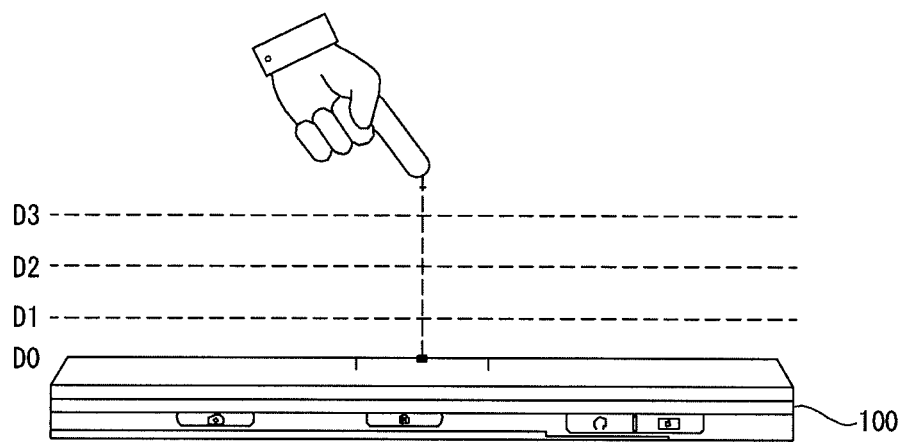
FIG. 2 is a conceptual view for explaining a proximity depth of a proximity sensor.

Next, FIG. 2 is a conceptual view illustrating a proximity depth of the proximity sensor 141. As shown in FIG. 2, when a pointer such as the user's finger, a pen, or the like, approaches the touch screen, the proximity sensor 141 disposed within or near the touch screen detects it and outputs a proximity signal. The proximity sensor 141 may also be configured to output a different proximity signal according to the distance (referred to as a 'proximity depth', hereinafter) between the closely touched pointer and the touch screen.

FIG. 2 also shows the section of the touch screen with the proximity sensor 141 for detecting, for example, three proximity depths. The proximity sensor 141 may detect three or less or four or more proximity depths. In more detail, when the pointer is fully brought into contact with the touch screen d0, this position is recognized as a contact touch. When the pointer is positioned to be spaced apart by shorter than a distance d1 on the touch screen, this position is recognized as a proximity touch with a first proximity depth.

If the pointer is positioned to be spaced apart by the distance longer than the distance d1 but shorter than a distance d2 on the touch screen, this position is recognized as a proximity touch with a second proximity depth. Also, if the pointer is positioned to be spaced apart by the distance longer than the distance d2 but shorter than a distance d3, this position is recognized as a proximity touch with a third proximity depth. If the pointer is positioned to be spaced apart by longer than the distance d3 on the touch screen, this position is recognized that the proximity touch has been released.

Accordingly, the controller 180 can recognize the proximity touches as various input signals according to the proximity depths and proximity positions of the pointer, and control various operations according to the various input signals.

Figure 3:
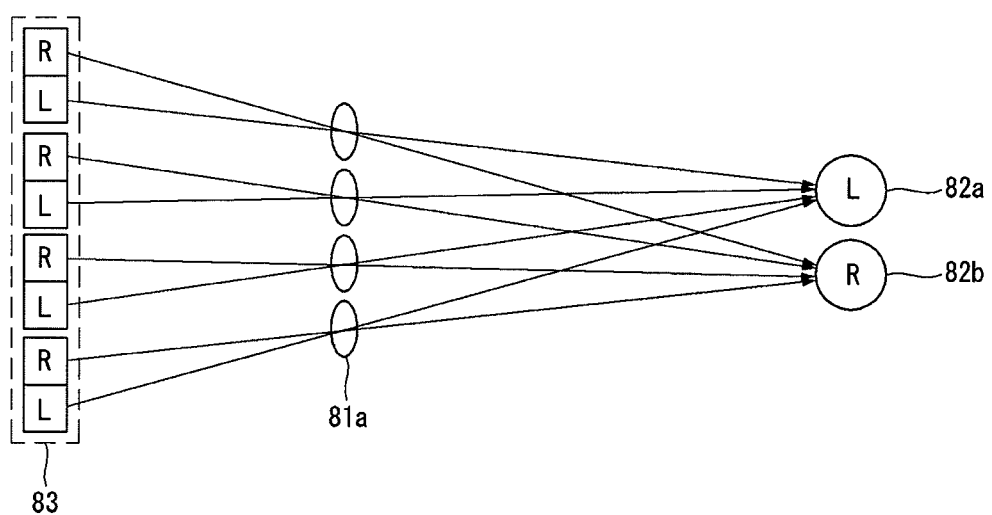
FIGS. 3 and 4 are overviews illustrating a method for displaying a stereoscopic image using a binocular parallax according to an embodiment of the present invention.
Figure 4:
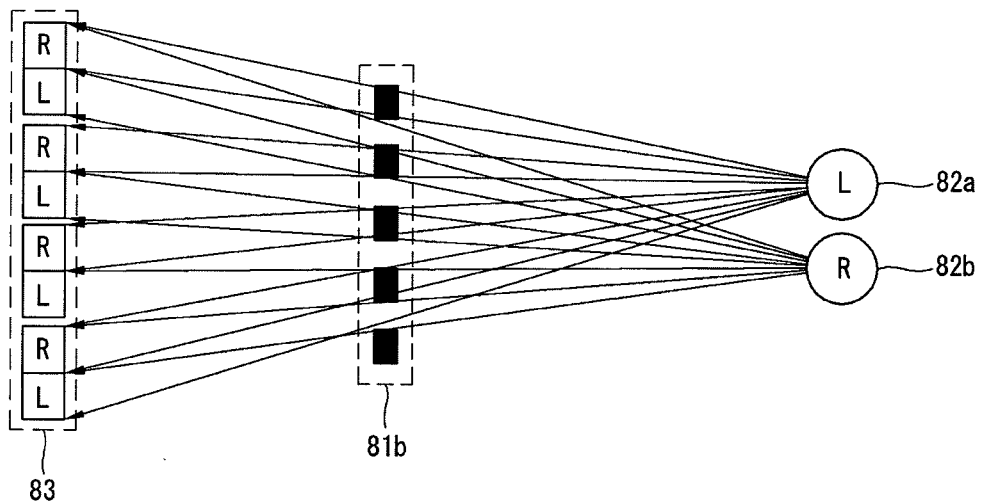

Next, FIGS. 3 and 4 are overviews illustrating a method for displaying a stereoscopic image using binocular parallax according to an embodiment of the present invention. Specifically, FIG. 3 shows a scheme using a lenticular lens array, and FIG. 4 shows a scheme using a parallax barrier.

Further, binocular parallax or stereo disparity refers to the difference in vision of viewing an object between a human being's (user's or observer's) left and right eyes. When the user's brain combines an image viewed by the left eye and that viewed by the right eye, the combined image makes the user feel stereoscopic. Hereinafter, the phenomenon in which the user feels stereoscopic according to binocular parallax will be referred to as a 'stereoscopic vision', and an image causing a stereoscopic vision will be referred to as a 'stereoscopic image'. Also, when a particular object included in an image causes the stereoscopic vision, the corresponding object will be referred to as a 'stereoscopic object'.

In addition, a method for displaying a stereoscopic image according to binocular parallax is classified into a glass type method and a glassless type method. In more detail, the glass type method may include a scheme using tinted glasses having a wavelength selectivity, a polarization glass scheme using a light blocking effect according to a deviation difference, and a time-division glass scheme alternately providing left and right images within a residual image time of eyes. The glass type method may further include a scheme in which filters each having a different transmittance are mounted on left and right eyes and a cubic effect with respect to a horizontal movement is obtained according to a time difference of a visual system made from the difference in transmittance.

Further, the glassless type method, in which a cubic effect is generated from an image display surface, rather than from an observer, includes a parallax barrier scheme, a lenticular lens scheme, a microlens array scheme, and the like.

With reference to FIG. 3, in order to display a stereoscopic image, the display module 151 includes a lenticular lens array 81*a*. The lenticular lens array 81*a* is positioned between a display surface on which pixels (L) to be input to a left eye 82*a* and pixels (R) to be input to a right eye 82*b* are alternately arranged along a horizontal direction, and the left and right eyes 82*a* and 82*b*, and provides an optical discrimination directionality with respect to the pixels (L) to be input to the left eye 82*a* and the pixels (R) to be input to the right eye 82*b*. Accordingly, an image which passes through the lenticular lens array 81*a* is separated by the left eye 82*a* and the right eye 82*b* and thusly observed, and the user's brain combines (or synthesizes) the image viewed by the left eye 82*a* and the image viewed by the right eye 82*b*, thus allowing the user to observe a stereoscopic image.

With reference to FIG. 4, in order to display a stereoscopic image, the display module 151 includes a parallax barrier 81*b* in the shape of a vertical lattice. The parallax barrier 81*b* is positioned between a display surface on which pixels (L) to be input to a left eye 82*a* and pixels (R) to be input to a right eye 82*b* are alternately arranged along a horizontal direction, and the left and right eyes 82*a* and 82*b*, and allows images are separately observed at the left eye 82*a* and the right eye 82*b*. Accordingly, the user's brain combines (or synthesizes) the image viewed by the left eye 82*a* and the image viewed by the right eye 82*b*, thus allowing the user to observe a stereoscopic image. The parallax barrier 81*b* is also turned on to separate incident vision only in the case of displaying a stereoscopic image, and when a planar image is intended to be displayed, the parallax barrier 81*b* may be turned off to allow the incident vision to pass therethrough without being separated.

Meanwhile, the foregoing methods for displaying a stereoscopic image are merely for explaining exemplary embodiments of the present invention, and the present invention is not meant to be limited thereto. Beside the foregoing methods, a stereoscopic image using binocular parallax may be displayed by using various other methods.

Figure 5:
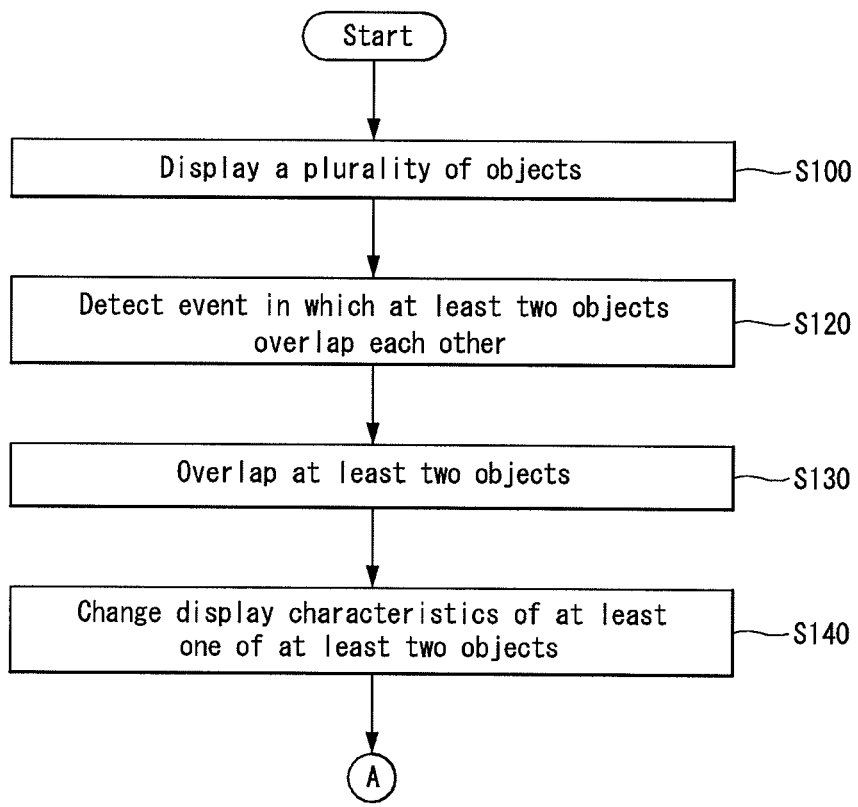
FIG. 5 is a flow chart illustrating a method for displaying an image of a mobile terminal according to a first embodiment of the present invention.

Next, FIG. 5 is a flow chart illustrating a method for displaying an image of a mobile terminal according to a first embodiment of the present invention, and FIGS. 6 to 18 are overviews illustrating the display method according to the first embodiment of the present invention. FIG. 1 will also be referred to in this description.

With reference to FIG. 5, the controller 180 displays a plurality of objects on the display unit 151 (S100). Further, each of the plurality of objects may be any one of a 2D (two-dimensional) object, a 3D (three-dimensional) object using stereo disparity, and a 3D object including a plurality of 2D layers.

The plurality of objects may also include any object that may be displayed on the display unit 151. For example, the plurality of objects may include an icon and a widget, and also include contents such as an application, a still image, a video, animation, flash, and the like. Examples of the plurality of objects may also be objects included in particular contents such as a still image, a video, and the like. Also, the plurality of objects may include a window, such as a menu window, an input window, a pop-up window, and the like, which provides or receives information.

Figure 6:
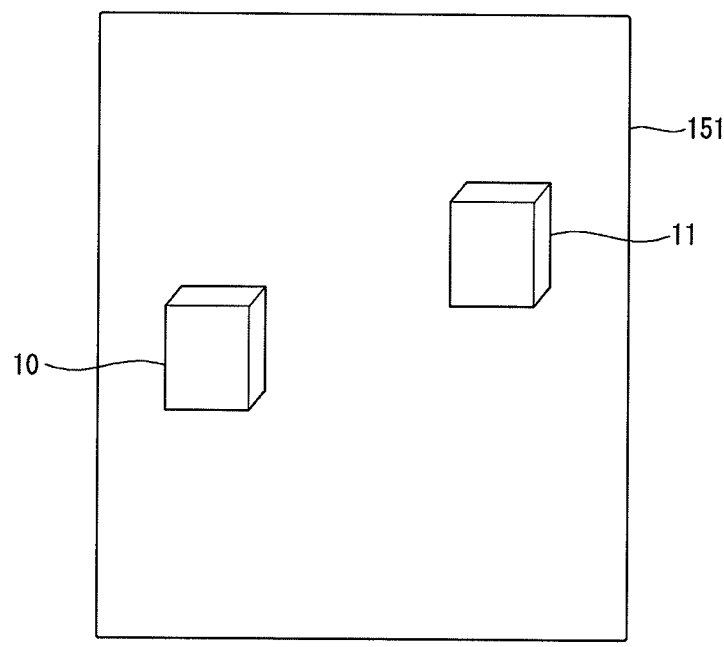
FIGS. 6 to 9 are overviews illustrating examples of a plurality of objects displayed on a display unit of the mobile terminal according to an embodiment of the present invention.
Figure 7:
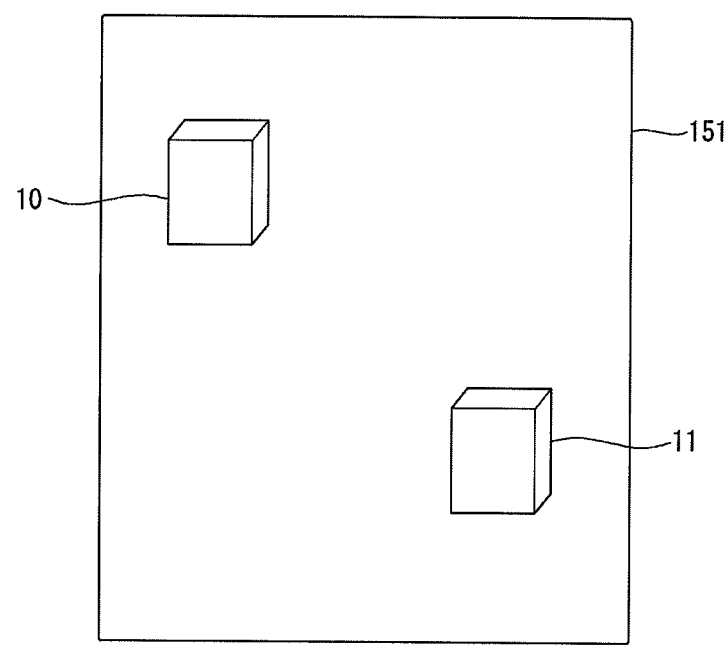
Figure 8:
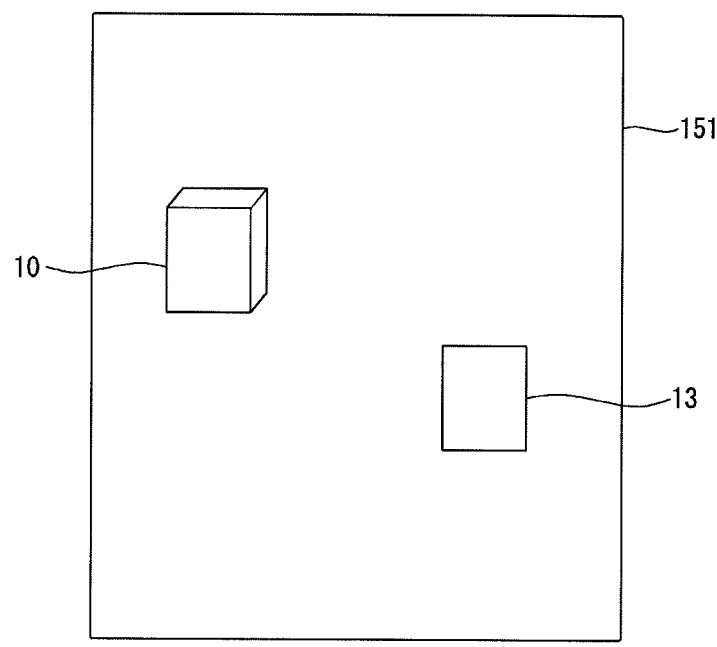
Figure 9:
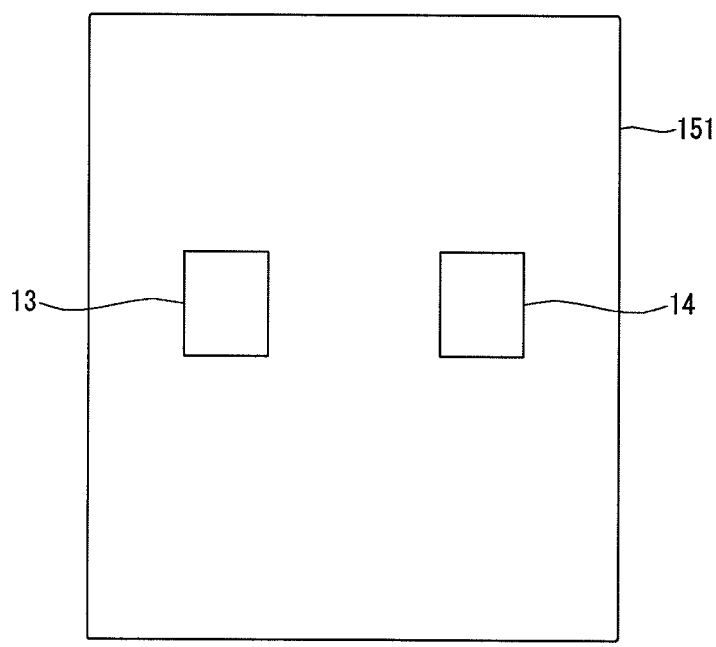

In more detail, FIGS. 6 to 9 are overviews illustrating examples of a plurality of objects displayed on the display unit 151. In more detail, FIG. 6 illustrates a screen displaying a first 3D object 10 and a second 3D object 11, each using a stereo disparity; FIG. 7 illustrates a screen displaying the first 3D object 10 using stereo disparity and a third 3D object 12 including a plurality of 2D layers; FIG. 8 illustrates a screen displaying the first 3D object 10 using stereo disparity and a first 2D object 13; and FIG. 9 illustrates a screen displaying the first 2D object 13 and a second 2D object 14.

Further, as shown in FIG. 5, the controller 180 detects an event in which at least two of the plurality of objects displayed on the display unit 151 overlap each other (S120). In more detail, FIG. 10 at least two objects being overlapped with each other according to a user's touch-and-drag operation.

Figure 10:
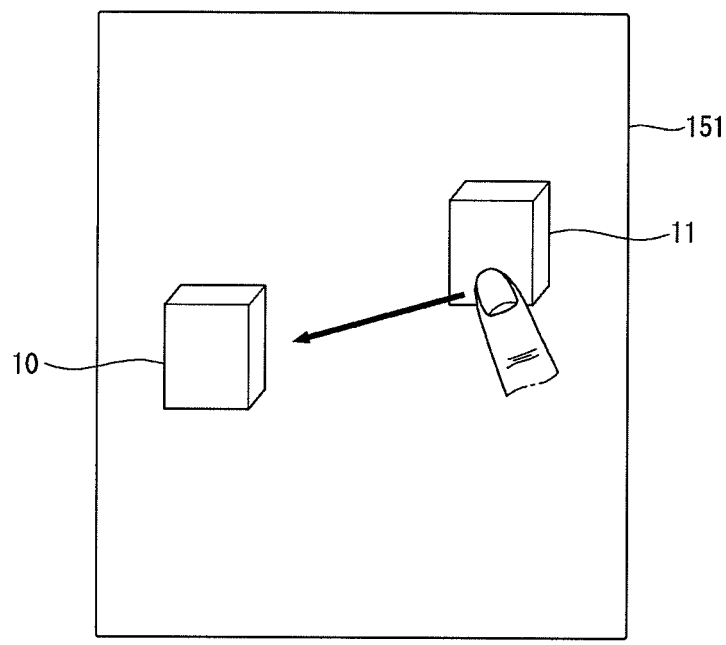
FIG. 10 is an overview illustrating at least two objects overlapping according to a user's touch-and-drag operation according to an embodiment of the present invention.

For example, as shown in FIG. 10, when the display unit 151 is implemented as a touch screen, the user can touch the second 3D object 11 with his finger (or other pointer) and move the touch to an area where the first 3D object 10 is displayed (e.g., a drag operation). The controller 180 can then detect the touch movement (i.e., the drag operation) and when the second 3D object 11 is brought into contact with the first 3D object 10, the controller 180 recognizes that as an event in which the first 3D object 10 and the second 3D object 11 overlap each other. The controller 180 then makes the at least two objects 10 and 11 overlap each other (S130).

Figure 11:
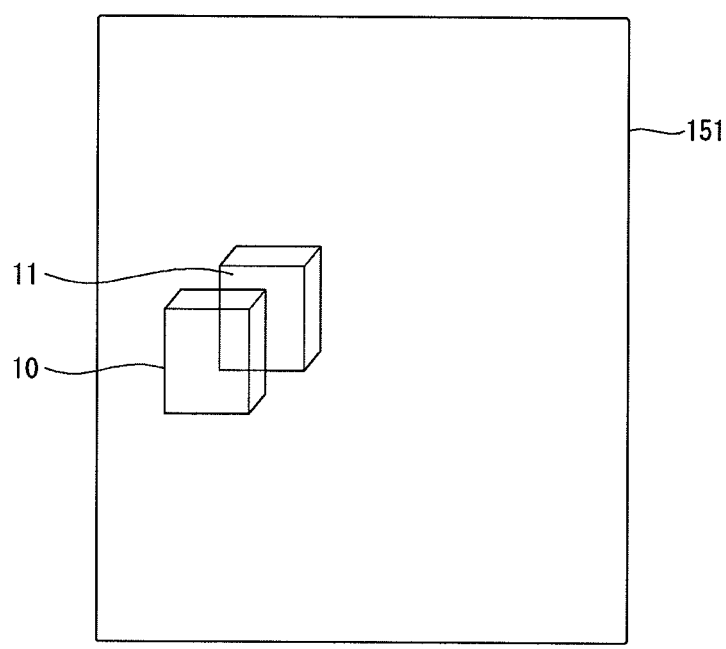
FIGS. 11 and 12 are overviews illustrating a concept of overlapping at least two objects according to an embodiment of the present invention.
Figure 12:
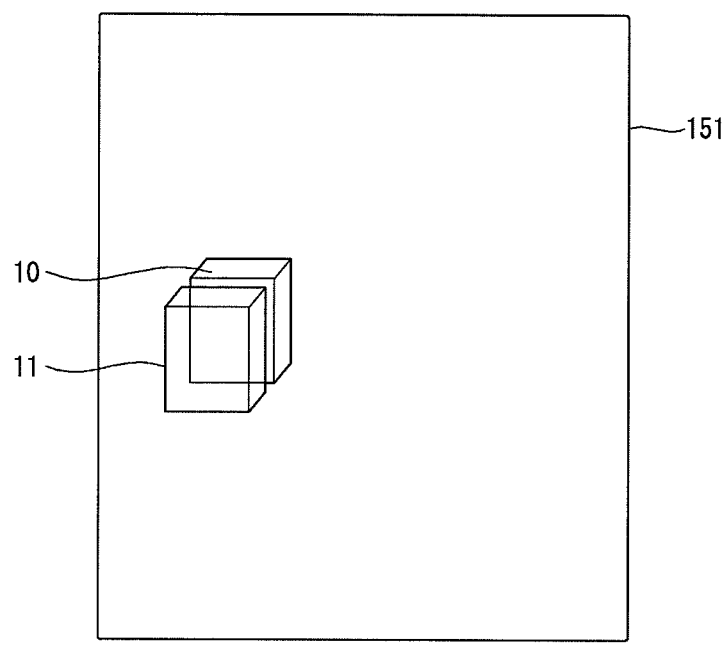

In more detail, FIGS. 11 and 12 are overviews illustrating a concept of overlapping at least two objects. With reference to FIG. 11, the controller 180 makes at least portions of the first and second 3D objects 10 and 11 overlap each other according to the touch movement (i.e., drag operation) performed in FIG. 10.

Next, FIG. 12 illustrates the first and second 3D objects 10 and 12 completely overlapping according to the touch movement. Then, as shown in FIG. 5, the controller 180 changes display characteristics of at least one of the at least two overlapping objects (S140).

Further, when the at least two objects displayed on the display unit 151 overlap each other, an image distortion phenomenon may occur, or the user visibility may be considerably degraded. In particular, when a 3D object using a stereo disparity is included in the two overlapping objects, the image distortion phenomenon and the user visibility become more severe.

For example, when a depth level of a 3D object using a stereo disparity is 10 to 20 and that of another 3D object using a stereo disparity is 15 to 25, the depth level 15 to overlaps when the two 3D objects overlap each other, causing an image distortion. In such a case, the controller 180 can change the display characteristics of at least one of the at least two overlapping objects to prevent an image distortion phenomenon or increase user visibility.

Various embodiments of changing display characteristics of at least one of at least two overlapping objects will now be described.

Change in Dimension

The display characteristics of at least one of overlapping objects may be changed by changing the original dimension of any one of the overlapping objects into a different dimension. For example, in the embodiment described above with reference to FIGS. 10 to 12, both of the first and second objects 10 and 11 are 3D objects using a stereo disparity. In this instance, the controller 180 can display at least one of the first and second 3D objects 10 and 11 two-dimensionally.

Figure 13:
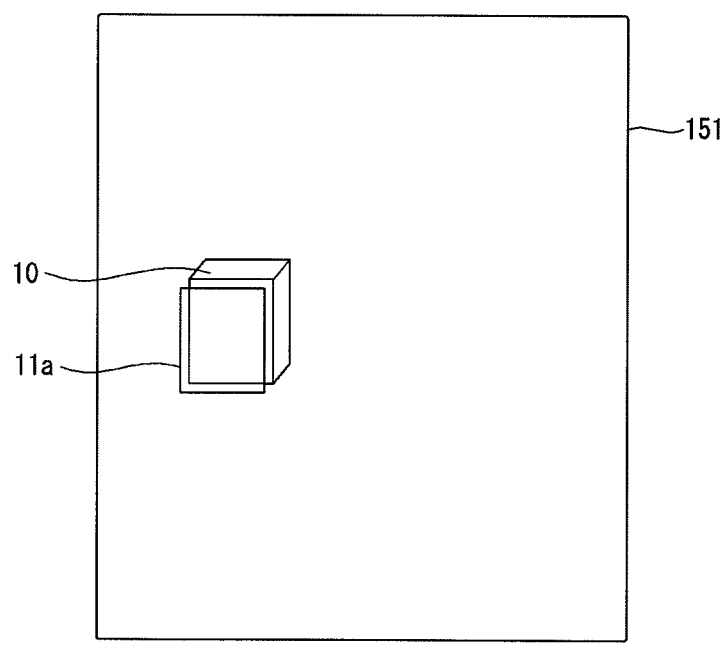
FIGS. 13 to 15 are overviews illustrating examples of display screens displaying at least one of first and second 3D objects two-dimensionally according to an embodiment of the present invention.
Figure 14:
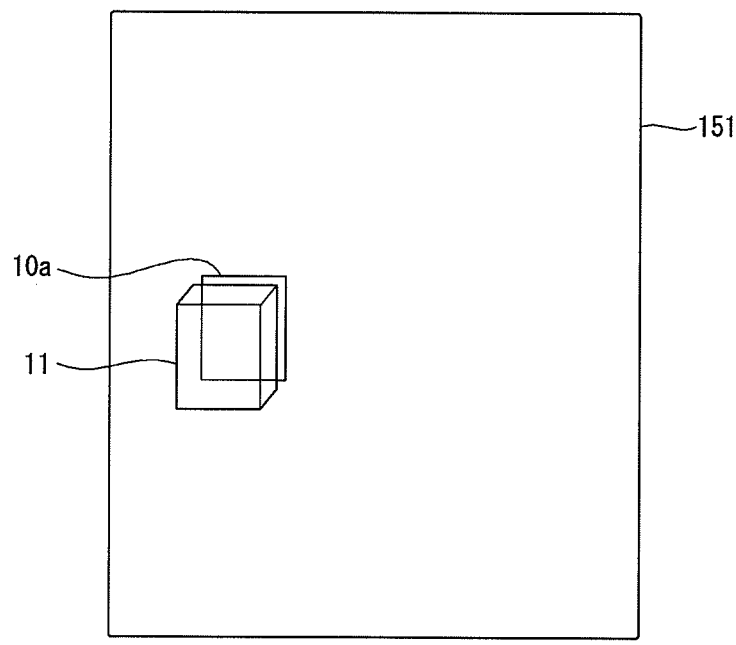
Figure 15:
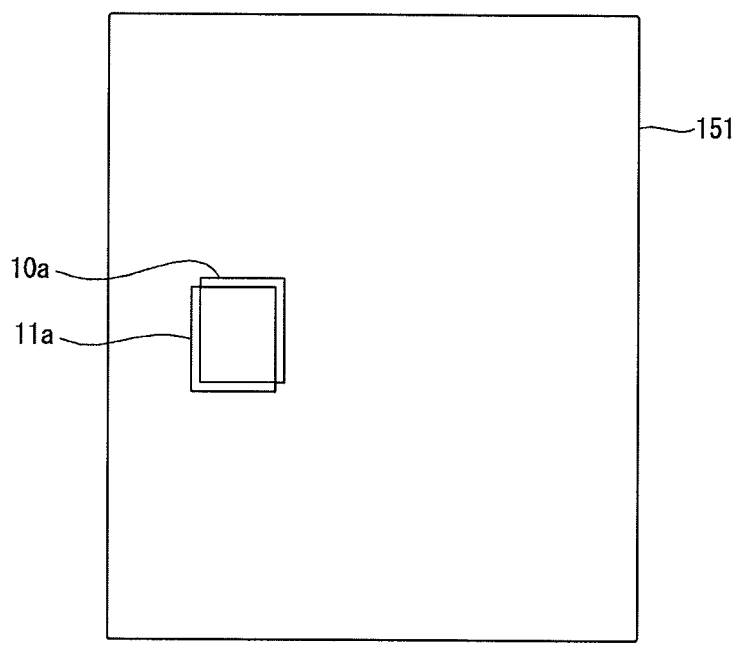

In more detail, FIGS. 13 to 15 are overviews illustrating examples of screens displaying at least one of the first and second 3D objects 10 and 11 two-dimensionally. For example, with reference to FIG. 13, the controller 180 converts the second 3D object 11 into a 2D object 11a and displays the converted 2D object.

In another example, and with reference to FIG. 14, the controller 180 converts the first 3D object 10 into a 2D object 10a and displays the converted 2D object 10a. In still another example, and with reference to FIG. 15, the controller 180 converts both of the first and second 3D objects 10 and 11 into 2D objects 10a and 11a and displays the converted 2D objects.

In addition, in the embodiment described above with reference to FIGS. 13 to 15, the first and second 3D objects 10 and 11 fully overlapping each other are taken as an example. Meanwhile, as shown in FIG. 11, when portions of the first and second 3D objects 10 and 11 overlap, the controller 180 can only change the overlapping portions into 2D objects.

In addition, when the first 3D object 10 and the first 2D object 13 overlap each other as shown in FIG. 8, the controller 180 can change the first 3D object 10 into a 2D object or the first 2D object 13 into a 3D object.

Change in Depth Level

In addition, the controller 180 can change the display characteristics of at least one of the overlapping two objects by changing a depth level of at least one of the two overlapping objects such that depth levels of the two overlapping objects do not overlap each other.

For example, as shown in FIGS. 12 to 15, the controller 180 can change the original depth level of the first and second 3D objects 10 and 11 such that the depth levels of the first and second overlapping 3D objects 10 and 11 do not overlap each other.

Further, this embodiment regarding the change in the depth levels may be applied in the same manner to the case in which a 3D object and a 2D object overlap each other and the case in which 2D objects overlap each other, as well as to the case in which the first and second 3D objects 10 and 11 overlap each other.

Meanwhile, when two objects overlap each other, although the original depth levels of them do not overlap, if the difference in perspective between the two overlapping objects is more than a predetermined level, the controller 180 can change the depth level of at least one of the two overlapping objects in order to reduce the difference in perspective.

In addition, when at least two 3D objects (referred to as '(3-1)th 3D object and (3-2)th 3D object, hereinafter) including a plurality of 2D layers each having a different depth level such as the third 3D object 12 overlap on the display unit 151 will now be described.

This example assumes the (3-1)th 3D object includes a first layer having a depth level 1 and a second layer having a depth level 3, and the (3-2) 3D object includes a third layer having a depth level 2 and a fourth layer having a depth level 4. When the (3-1) 3D object and the (3-2) 3D object overlap each other, the controller 180 can sequentially display the first to fourth layers according to their depth levels.

Figure 16:
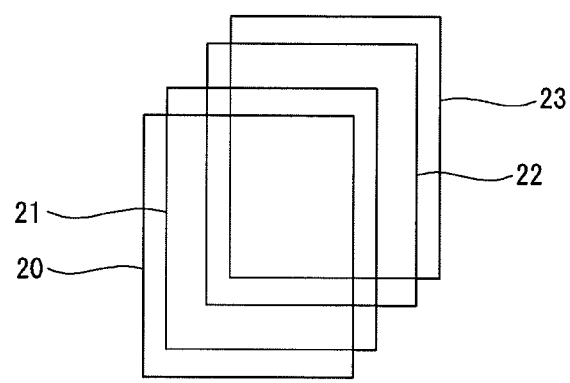
FIG. 16 is an overview illustrating an example of changing display characteristics when two 3D objects each including a plurality of 2D layers overlap each other according to an embodiment of the present invention.

In more detail, FIG. 16 is an overview illustrating an example of changing display characteristics when two 3D objects each including a plurality of 2D layers overlap each other. For example, as shown in FIG. 16, the controller 180 displays a first layer 20, a second layer 21, a third layer 22, and a fourth layer 23 in this order, to display the (3-1)th 3D object and the (3-2)th 3D object in an overlapping manner. Thus, to the user, the first layer 20 is seen to be the most prominent and the fourth layer 23 is seen to be the deepest.

Change in Transparency

Further, the controller 180 can change the display characteristics of at least one of the two overlapping objects by changing the transparency of at least one of the two overlapping objects. For example, when the two objects overlap each other as shown in FIGS. 6 to 9, the controller 180 can make the overlapping area transparent. In addition, the controller 180 can make only the object having a depth level (or the range of a depth level) which is closer to the user transparent, or make both of the two objects of the overlapping area transparent.

Tilting

Further, when any one of at least two overlapping objects is a 3D object and the other remaining one is a 2D object, the controller 180 can change the display characteristics of at least one of the two overlapping objects by tilting the 2D object. In particular, FIGS. 17 and 18 are overviews illustrating an example in which display characteristics of at least one of two overlapping objects are changed according to a tilting method.

Figure 17:
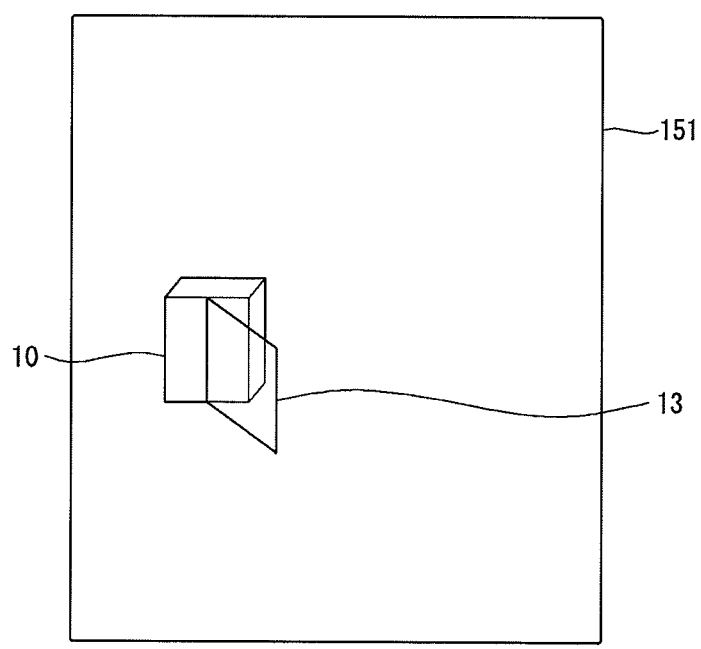
FIGS. 17 and 18 are overviews illustrating an example in which display characteristics of at least one of two overlapping objects are changed according to a tilting method according to an embodiment of the present invention.
Figure 18:
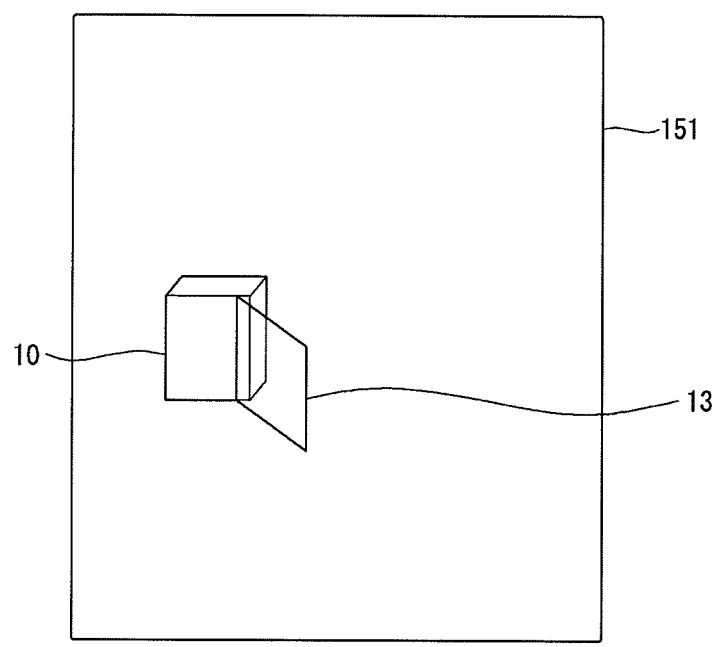

For example, when the first 3D object 10 and the first 2D object 13 overlap each other as shown in FIG. 17, the controller 180 can tilt the first 2D object 13 to reduce the area in which the first 3D object 10 and the first 2D object 13 overlap each other, compared with the area before tilting. In addition, the tilting angle may be previously set. For example, when the tilting angle is set to be large, the first 3D object 10 and the first 2D object 13 may have a shape similar to a polyhedron as shown in FIG. 18.

Next, FIG. 19 is a flow chart illustrating a method of displaying an image of a mobile terminal according to a second embodiment of the present invention, and FIGS. 20 to 26 are overviews illustrating the display method according to the second embodiment of the present invention. FIG. 1 will also be referred to in this description. The method for displaying an image of a mobile terminal according to the second embodiment may also be based on the first embodiment of the present invention.

As shown in FIG. 19, the controller 180 receives update information related to a particular application (S200). The update information may include at least one of first update information related to an increase in a version of the particular application (or a decreased version) and second update information related to contents provide to the user through the particular application. The increase or decrease in the version can be an update to an existing application, a newer version of the application, an older version of the application if a particular application was not executing properly, etc.

For example, the controller 180 can receive weather information through a weather application corresponding to a weather widget and provide the received weather information to the user. In another example, the controller 180 can receive news information through a news application corresponding to a news widget and provide the received news information to the user. In still another example, the controller 180 can receive version-up information of the weather application and/or the news application from the exterior.

The controller 180 can then determine whether or not an object corresponding to the particular application corresponding to the received update information overlaps with a different object (S210). For example, and with reference to FIG. 12, update information related to an application corresponding to the first 3D object 10 or an application corresponding to the second 3D object 11 can be received.

When the object (e.g., the first 3D object 10 and/or the second 3D object 11) corresponding to the particular application is displayed to overlap with another object (e.g., the first 3D object 10 or the second 3D object 11) as shown in FIG. 12 according to the determination results of step S210, the controller 180 can change the display characteristics of at least one of the overlapping objects (S220).

Various embodiments of changing display characteristics of at least one of the overlapping objects when the update information is received will now be described in more detail.

Change in Depth Level

In particular, the controller 180 can change display characteristics of at least one of at least two overlapping objects by changing a depth level of an object corresponding to the particular application related to the received update information among the at least two overlapping objects.

In more detail, FIGS. 20 and 21 are overviews illustrating the controller 180 changing the display characteristics of an object based on reception of update information according to a depth level changing scheme. For example, FIG. 20 illustrates a state in which the first 3D object 10 and the first 2D object 13 are displayed to overlap each other such that the range of a depth level of the first 3D object 10 is deeper than the depth level of the first 2D object 13, and update information related to an application corresponding to the first 3D object 10 is received.

In this example, the controller 180 changes the depth level of at least one of the first 3D object 10 and the first 2D object 13 such that the range of the depth level of the first 3D object 10 becomes thinner than the depth level of the first 2D object 13. Namely, the controller 180 changes the range of the depth level of the first 3D object 10, changes the depth level of the first 2D object 13, or changes both of the range of the depth level of the first 3D object and the depth level of the first 2D object 13, so that the first 3D object 10 may be seen to be more prominent than the first 2D object 13.

In more detail, the controller 180 changes the first 3D object 10 from the rear side to the front side so as to be prominent from the front side, and thus the user can recognize that update information related to the application corresponding to the first 3D object 10 has been received.

In another example, and as shown in FIG. 21, the first 3D object 10 and the first 2D object 13 are displayed to overlap each other such that the depth level of the first 2D object 13 is deeper than the range of the depth level of the first 3D object 10, and update information related to an application corresponding to the first 2D object 13 is received.

In this example, the controller 180 can change the depth level of at least one of the first 3D object 10 and the first 2D object 13 such that the range of the depth level of the first 3D object 10 becomes deeper than the depth level of the first 2D object 13.

Namely, the controller 180 changes the range of the depth level of the first 3D object 10, changes the depth level of the first 2D object 13, or changes both of the range of the depth level of the first 3D object and the depth level of the first 2D object 13, so that the first 2D object 13 may be seen to be more prominent than the first 3D object 10.

In more detail, the controller 180 changes the first 2D object 13 from the rear side to the front side so as to be prominent from the front side, and the user can recognize that update information related to the application corresponding to the first 2D object 13 has been received.

Providing a 3D Indicator

The controller 180 can also change display characteristics of at least one of two overlapping objects by displaying a 3D indicator indicating the received update information such that the 3D indicator overlaps with the object corresponding to the particular application related to the received update information.

In more detail, FIGS. 22 and 23 are overviews illustrating the controller 180 changing the display characteristics of an object according to reception of the update information by displaying a 3D indicator. For example, and with reference to FIGS. 22 and 23, when at least portions of the first and second 3D objects 10 and 11 are disposed in an overlapping manner, the controller 180 can display a first 3D indicator 30 or a second 3D indicator 31 such that it overlaps with the second 3D object 30 so as to correspond to the second 3D object 30 as the update information related to the application corresponding to the second 3D object 11 is received.

The first and second 3D indicators 30 and 31, indicating that the update information has been received, thus informs the user that the update information has been received. The first 3D indicator 30 can also indicate the update information has been received, and the second 3D indicator 30 can indicate the update information has been received and the number of received update information (three update information in FIG. 23).

Change in Position of Object

The controller 180 can also change display characteristics of at least one of two overlapping objects by changing the position of the object corresponding to the particular application related to the received update information. In more detail, FIG. 24 is an overview illustrating the controller 180 changing display characteristics by changing a position of an object based on received update information.

For example, as shown in FIG. 24, when update information related to the application corresponding to the first 2D object 13 is received in a state as shown in FIG. 21, the controller 180 moves the position of the first 2D object 13 to the right. Also, when the first 3D object 10 and the first 2D object 13 overlap each other as shown in FIG. 21, and when the first 2D object 13 is moved to the right as shown in FIG. 24, the user can recognize that the update information related to the application corresponding to the first 2D object 13 has been received.

Meanwhile, when the user touches the first 2D object 13 on the screen illustrated in FIG. 24 with his finger or other pointer (including a proximity touch), the controller 180 can move the first 2D object 13 to the left so as to be re-positioned as illustrated in FIG. 21.

Change in Transparency

Further, when the object corresponding to the particular application related to the received update information among the two overlapping objects is displayed with a deeper level than the other object, the controller 180 can change display characteristics of at least one of two overlapping objects by changing the transparency of the other object.

For example, when update information is received related to the application corresponding to the first 3D object 10 seen to relatively recede compared with the second 3D object 11 in FIG. 12, the controller 180 increases the transparency of the second 3D object 11 so that the first 3D object 10 can be seen more clearly. Thus, because the first 3D object 10 is seen more distinctly than it was before, the user can recognize that the update information related to the application corresponding to the first 3D object 10 has been received.

Other Display Changing Characteristics

The controller 180 can also change display characteristics of at least one of two overlapping objects by changing the color of the object corresponding to the particular application related to the received update information, by tilting the object corresponding to the particular application (FIGS. 17 and 18), or by changing the size of the object corresponding to the particular application.

Controlling of Display Characteristics According to First and Second Update Information The above embodiments may be differently applied to when the first update information related to version information is received, and when the second update information related to providing contents is received. Namely, the controller 180 can differently change the display characteristics according to whether or not the received update information is the first update information or the second update information.

For example, FIGS. 25 and 26 are overviews illustrating the controller 180 controlling the display characteristics differently according to first and second update information. In particular, FIGS. 25 and 26 show a screen image whose display characteristics are changed when the first update information is received and a screen image whose display characteristics are changed when the second update information is received, respectively, when the first and second 3D objects 10 and 11 overlap each other as shown in FIG. 22.

For example, and with reference to FIG. 25, when update information related to an increase in version information (version-up) of the application corresponding to the first 3D object 10 is received in the state of FIG. 22, the controller 180 can increase the transparency of the second 3D object 11 such that the first 3D object 10 is seen to be prominent compared with the second 3D object 11. That is, the first 3D object 10 has received update information but is slightly blocked by the overlapping second 3D object 11. By changing the transparency of the second 3D object 11, the first 3D object can be seen better.

In another example, and with reference to FIG. 26, when update information related to contents which may be provided through the application corresponding to the first 3D object 10 is received in the state of FIG. 22, the controller 180 can change the display characteristics of the first 3D object 10 which was displayed at a deeper level than the second 3D object, such that the first 3D object 10 is seen to be prominent compared with the second 3D object 11. In this manner, the controller 180 can differently change the display characteristics of at least one of the particular object and the different object.

Third and fourth embodiments will now be described. The third and fourth embodiments of the present invention assume the display unit 151 includes a touch screen 151. As discussed above, the touch screen 151 may perform both an information display function and information input function. Further, a touch mentioned in this document may include both a contact touch and a proximity touch.

In more detail, FIG. 27 is a flow chart illustrating a method for displaying an image of a mobile terminal according to the third embodiment of the present invention, and FIGS. 28 to 49 are overviews illustrating a method for controlling a mobile terminal according to the third embodiment. FIG. 1 will also be referred to in this description.

With reference to FIG. 27, the controller 180 displays a plurality of objects in an overlapping manner on the touch screen 151 (S300). Further, each of the plurality of objects may be any one of a 2D (two-dimensional) object, a 3D (three-dimensional) object using stereo disparity, and a 3D object including a plurality of 2D layers. The plurality of objects may also include any object that may be displayed on the touch screen 151.

For example, the plurality of objects may include an icon and a widget, and also include contents such as an application, a still image, a video, animation, flash, and the like. In another example, the plurality of objects may be objects included in particular contents such as a still image, a video, and the like. Also, the plurality of objects may include a window, such as a menu window, an input window, a pop-up window, and the like, which provides or receives information.

Next, FIG. 28 shows examples of a plurality of objects displayed in an overlapping manner on the touch screen 151. As shown in FIG. 28, the controller 180 displays a first object 50, a second object 51, and a third object 52 in an overlapping manner on the touch screen 151. In addition, the causes of overlapping of the first to third objects 50 to 52 may vary. Namely, the overlapping of the first to third objects 50 to 52 may be caused by a user manipulation or may be set by an application, and the first to third objects 50 to 52 may be set to be displayed to overlap with contents.

FIG. 29 is an overview illustrating examples of widgets to which first to third objects 50, 51, and 52 correspond. In this example, the first to third objects 50 to 52 correspond to a weather widget, a news widget, and a traffic widget, respectively. In addition, the controller 180 can receive weather information through a weather application corresponding to the weather widget and provide the same to the user. The controller 180 can also receive weather information through a weather application corresponding to the weather widget and provide the received weather information to the user.

Also, the controller 180 can receive news information from the exterior through a news application corresponding to the news widget and provide the received news information to the user. Further, the controller 180 can receive traffic information from the exterior through a traffic application corresponding to the traffic widget and provide the received traffic information to the user.

Meanwhile, the controller 180 can make the plurality of overlapping objects appear 3D. For example, if the plurality of objects are 2D objects, and when the plurality of objects overlap each other, the controller 180 controls the plurality of objects such that the depth level of each of the plurality of objects are different to thereby configure the plurality of overlapping objects as a 3D object.

In another example, if the plurality of objects are 3D objects each using a stereo disparity, and when the plurality of objects overlap each other, the controller 180 can control the plurality of objects such that the depth level of each of the plurality of objects are different to thereby configure the plurality of overlapping objects as a 3D object using a stereo disparity as a whole.

In addition, as shown I FIG. 27, when a touch operation with respect to an area in which the plurality of objects are overlapping (S310), the controller 180 displays the plurality of objects to allow each of the plurality of objects to be accessed by a touch (S320).

Further, the touch operation in step S310 for performing step S320 may vary. Also, the performing method in step S320 according to a particular touch operation performed in step S310 may also vary. Various embodiments performed in steps S310 and S320 will now be described in more detail.

Unfolding

FIGS. 30 and 31 are overviews illustrating examples of the performing step S310, and FIGS. 32 and 33 are overviews illustrating examples of the step S320 according to a touch operation performed in FIG. 30 or 31. For example, as shown in FIG. 30, the user may input a single touch with respect to an area in which the plurality of objects are overlapping, or as shown in FIG. 31, the user may input a stroke action with respect to an area in which the plurality of objects are overlapping. The stroke action includes a flicking and dragging operation, for example, and will hereinafter be referred to as a stroke action.

Further, the controller 180 can perform an operation of unfolding at least a portion of the plurality of overlapping objects so that each of the objects can be accessed by a touch. For example, with reference to FIG. 32, the controller 180 can display the plurality of objects such that all of the first to third overlapping objects 50, 51 and 52 are unfolded as the single touch illustrated in FIG. 30 is received or as the stroke illustrated in FIG. 31 is received.

In particular, FIG. 32 shows an example in which the first to third overlapping objects 51 to 53 are unfolded such that after the third object 52 having the deepest depth level is moved from the state of FIG. 28, the second object 51 is moved, and the first object 50 is maintained at its original position.

In addition, FIG. 33 shows an example in which the first to third overlapping objects 51 to 53 are unfolded such that after the first object 51 having the thinnest depth level is moved from the state of FIG. 28, the second object 51 is moved, and the third object 52 is maintained in its original position.

Meanwhile, when the touch operation in step S310 is the stroke operation, the controller 180 can control the unfolding operation in consideration of at least one of the direction, distance and speed of the stroke operation. For example, the controller 180 can perform the unfolding operation in a direction corresponding to the direction of the stroke operation. With reference to FIGS. 31 and 32, as the user inputs a stroke operation in a rightward direction, the controller 180 can unfold the plurality of overlapping objects in the rightward direction.

Next, FIGS. 34 and 35 are overviews illustrating another example of the steps S310 and S320 performed according to a stroke operation. For example, when the user inputs a stroke operation in a leftward direction as shown in FIG. 34, the controller 180 unfolds the plurality of overlapping objects in the leftward direction as shown in FIG. 35.

Also, when the user inputs a stroke operation in downward or upward direction, the controller 180 can unfold the plurality of overlapping objects in the leftward or upward direction according to the stroke direction. In addition, the controller 180 can determine the number of unfolded objects among the plurality of objects according to at least one of the distance and speed of the stroke operation, for example.

Next, FIG. 36 is an overview illustrating an example in which the degree of unfolding a plurality of objects varies according to at least one of the distance and speed of the stroke operation. With reference to FIG. 36, when the user inputs a smaller stroke operation of which at least one of the distance and speed is smaller than that of the stroke operation performed in FIG. 31, the controller 180 can unfold the first object 50 among the first to third overlapping objects 50 to 53 and maintain the overlap state of the second and third objects 51 and 52.

After the unfolding operation in step S320, and as shown in FIG. 27, the controller 180 can return the plurality of objects in the overlap state after the lapse of a certain time (S330). Further, after the unfolding operation in step S320, and when a particular object among the plurality of objects is selected before the pre-set time lapses (S330 and S340), the controller 180 can execute an application corresponding to the selected object (S350).

Next, FIGS. 37 and 38 are overviews illustrating examples of touch operations to execute an application corresponding to a particular object among the plurality of objects. For example, with reference to FIG. 37, the user can select the third object 52 by touching the third object 52 among the first to third unfolded objects 50 to 52.

The controller 180 can then execute a traffic widget corresponding to the selected third object 52. Meanwhile, when the touch operation performed in step S310 is a single touch operation and the single touch is moved to a point included in the area in which the plurality of unfolded objects are displayed and then released therefrom, the controller 180 can execute an application corresponding to the object displayed at the point.

For example, and with reference to FIG. 38, when the user touches a point A when the first to third objects 50 to 52 overlap, the controller 180 can move the second and third objects 51 and 52 to be unfolded as described above. Further, with the first to third objects 50 to 52 unfolded, and when the user moves the touch applied to the point A to a point B (rather than releasing the touch with respect to the point A) and releases the touch from the point B, the controller 180 can execute a news widget corresponding to the second object 51 displayed at the point B.

Meanwhile, when the touch operation performed in step S310 is a single touch operation and the single touch is maintained by less than a predetermined time, the controller 180 performs the unfolding operation, and when the single touch is maintained by more than the predetermined time, the controller can execute at least one of the plurality of applications corresponding to the plurality of objects, respectively.

In addition, all the plurality of applications corresponding to the plurality of overlapping objects may be executed, which will be described in more detail later.

Rolling or Looping

Meanwhile, in another example of performing the steps S310 and S320, the controller 180 can display the plurality of overlapping objects in a rolling manner whenever a single touch with respect to the area in which the plurality of objects overlap. In particular, FIGS. 39 and to 42 are overviews illustrating examples of performing steps S310 and S320 in relation to rolling of the plurality of objects.

Figure 40:
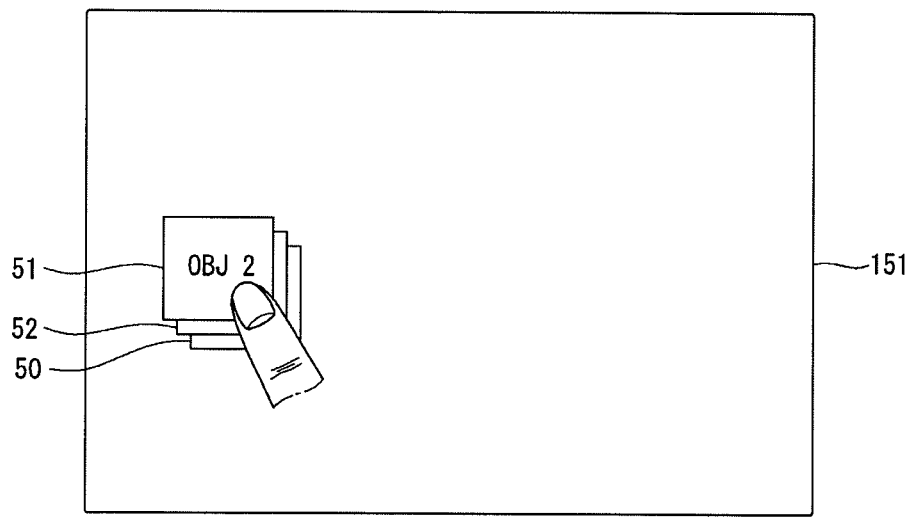

For example, when the user touches the first to third overlapping objects 50 to 52 as shown in FIG. 39, the controller 180 displays the first object 50, which was displayed to have the lowest depth level among the objects 50 to 52, to have the highest depth level and displays the second object 51, which existed at a lower side of the first object 50, to have the lowest depth level, whereby the second object 51 is positioned at the uppermost as shown in FIG. 40.

Figure 41:
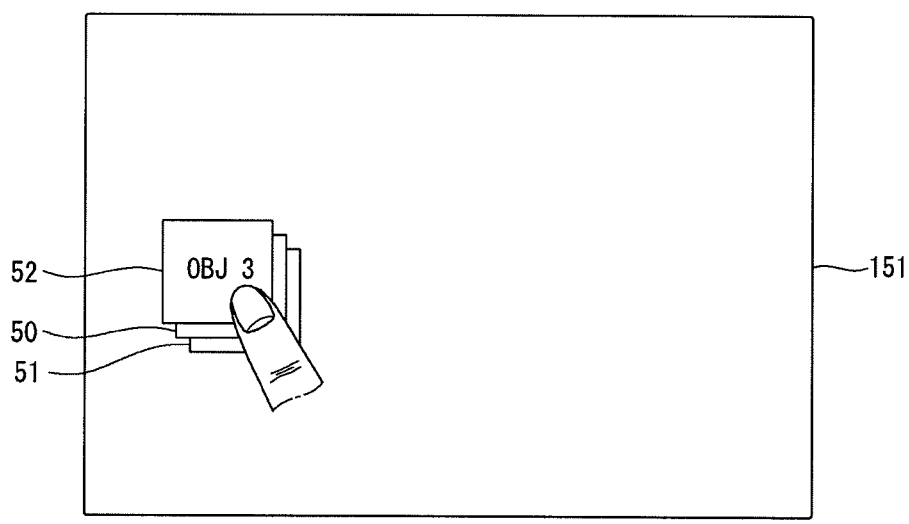

Also, when the user touches the second object 51 in the state of FIG. 40, the controller 180 moves the second object 52 to the lowest depth position and the third object 52 to be positioned at the uppermost position as shown in FIG. 41, for example. In addition, when the user touches the third object 52 in the state of FIG. 41, the controller 180 displays the first to third objects 50 to 52 to return to the screen illustrated in FIG. 39.

Further, when the user touches the area in which the first to third overlapping objects 50 to 52 and the touch is maintained for more than a pre-set time (long touch), the controller 180 can execute an application corresponding to the uppermost object, or can execute all of the weather widget, the news widget, and the traffic widget corresponding to the first to third objects 50 to 52, which will be described in more detail later.

Also, when the user applies a stroke operation with respect to the area in which the plurality of objects overlap, the controller 180 can display the plurality of overlapping objects in a rolling manner. For example, with reference to FIG. 42, when the user touches a point C in the state of FIG. 42(a) and then release the touch, the controller 180 can execute the weather widget corresponding to the first object 50.

In addition, when the user moves the touch to a point D as shown in FIG. 42(b) (rather than releasing the touch with respect to the point C in the state of FIG. 42(a)), the controller 180 can display the first to third objects 50 to such that the second object 51 is the uppermost object according to the method as described above. Further, when the user releases the touch from the point D in the state of FIG. 42(b), the controller 180 can execute the news widget corresponding to the second object 51.

In addition, when the user moves the touch to a point E as shown in FIG. 42(c) (rather than releasing the touch with respect to the point D in the state of FIG. 42(b)), the controller 180 can display the first to third objects 50 to such that the third object 52 is the uppermost object according to the method as described above. Also, when the user releases the touch from the point E in the state of FIG. 42(c), the controller 180 can execute the news widget corresponding to the second object 51.

Figure 42:
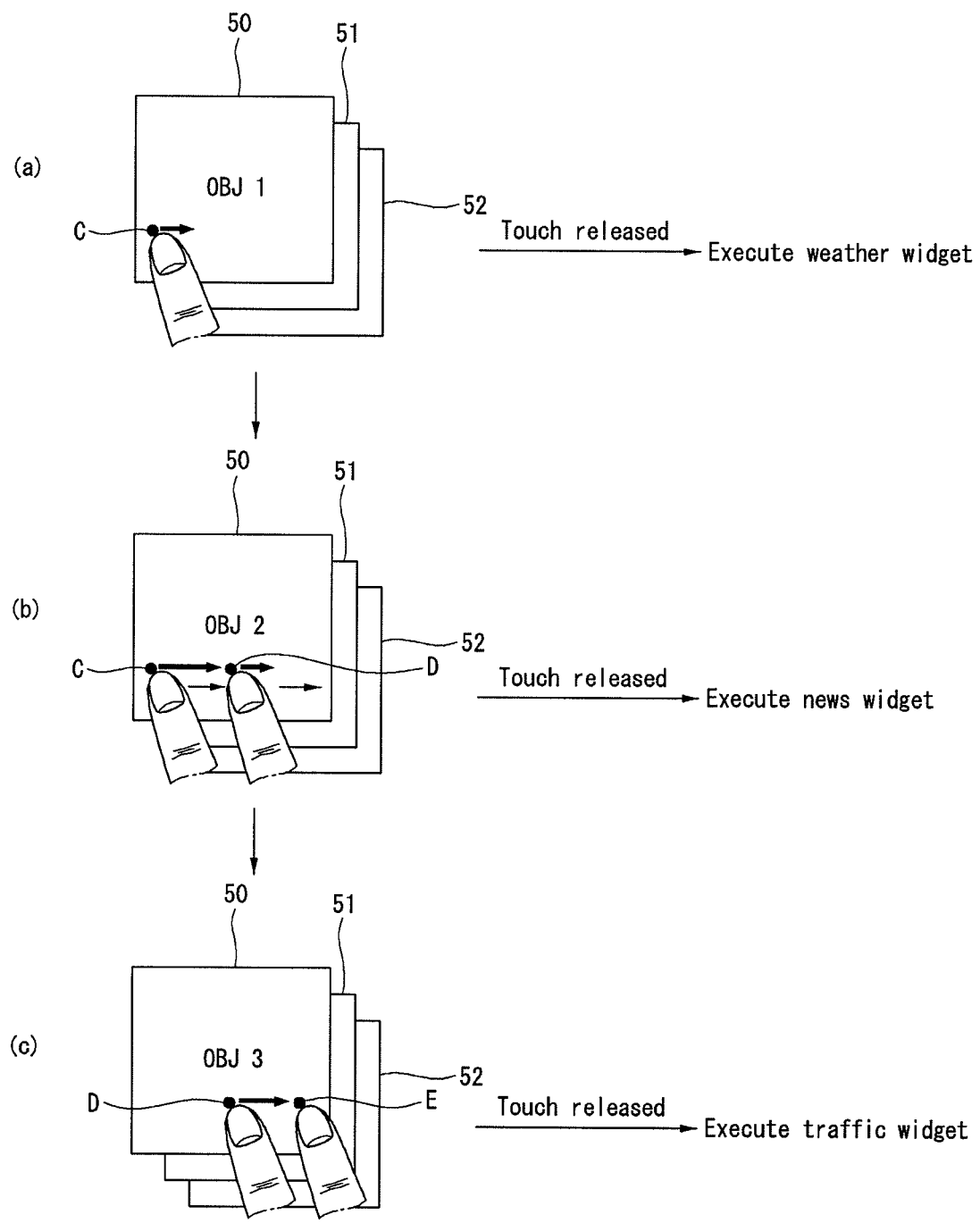

Further, when the user moves the touch toward the point D and the point C in the state of FIG. 42(c), the controller 180 can display the first to third objects 50 to to return to the states of FIGS. 42(b) and 42(a). In addition, in FIG. 42, the drag operation is performed horizontally, but the present invention is not meant to be limited thereto. For example, when the drag operation is performed vertically, the displaying of the first to third objects 50 to 52 and the executing of the corresponding applications may be controlled in the same manner as shown in FIG. 42.

Providing of Pop-Up Window

In another example of performing the steps S310 and S320, when a touch operation (e.g., the single touch) previously determined with respect to the area in which the plurality of objects are overlap is received, the controller 180 can display a pop-up window including a plurality of items indicating the plurality of applications corresponding to the plurality of objects to the touch screen. Also, when the user selects any one of the plurality of items, the controller 180 can execute an application corresponding to the selected item.

Next, FIG. 43 is an overview illustrating an example of performing the steps S310 and S320 in relation to a pop-up window. For example, with reference to FIG. 43, when the user touches the area in which the first to third overlapping objects 50 to 52 overlap, the controller 180 can display a pop-up window 60 including first to third items 61 to 63 corresponding to the first to third objects 50 to 52 on the touch screen 151.

In addition, the first to third items 61 to 63 correspond to the weather widget, the news widget, and the traffic widget, like the first to third objects 50 to 52. Also, as shown in FIG. 43, the first to third items 61 to 63 may be the same objects as the first to third objects 50 to 52 but having a different size, or may be different objects (e.g., images, icons, or the like) corresponding to the first to third objects 50 to 52.

Meanwhile, the pop-up window 60 may be set to be displayed only while the touch is maintained on the area in which the first to third objects 50 to 52 are displayed. Also, the pop-up window 60 may be set to automatically disappear when a certain time lapses, after being displayed on the touch screen 151. Further, the pop-up window 60 may be displayed in 2D, 3D using a stereo disparity, or 3D including a plurality of 2D layers.

In addition, when the user touches a particular item among the first to third items 61 to 63 included in the pop-up window 60 to select the item, the controller 180 can execute a widget (or an application) corresponding to the selected particular item.

Rotation of Polyhedron

Meanwhile, in another example of performing the steps S310 and S320, the controller 180 can display the plurality of overlapping objects as a polyhedron, and when a stroke operation with respect to the polyhedron is received, the controller 180 can rotate the polyhedron in consideration of at least one of the direction, distance, and speed of the stroke operation. The polyhedron can also be displayed as 3D using a stereo disparity. Further, the user may select a particular side constituting the polyhedron, and the controller 180 then executes an application corresponding to an object displayed on the selected particular side.

Next, FIGS. 44 to 46 are overviews illustrating examples of performing the steps S310 and S320 when the plurality of objects are formed as a polyhedron. For example, 2D objects 65, 66, 67, and 68, and 3D object groups 70, 71, and 72 constituting the foregoing polyhedron are displayed on the screen illustrated in FIG. 44. Each of the 3D object groups 70 to 72 may also include a plurality of objects.

For example, the first 3D object group 70 may be configured as a polyhedron, and first to sixth menus may correspond to each side of the first 3D object group 70. When the user drags the first 3D object group in a downward direction in the state of FIG. 45, the controller 180 can rotate the first 3D object group 70 in the downward direction to turn to the state of FIG. 46, and thus control the displaying of the first 3D object group 71.

Namely, the controller 180 can rotate the polyhedron (the first 3D object group 70 in FIGS. 44 to 46) in the direction corresponding to the direction of the drag operation (or flicking operation). Also, the controller 180 can control the degree of rotation of the polyhedron according to at least one of the distance and speed of the drag operation (or flicking operation).

For example, as the speed of the user's drag operation increase, the controller 180 can rotate the polyhedron more times. Also, as the distance of the user's drag operation increases, the controller 180 can rotate the polyhedron more times.

In addition, in FIGS. 44 to 46, when the user touches a side to which a menu desired by the user corresponds, the controller 180 can execute an application corresponding to the menu displayed on the touched side. Meanwhile, the controller 180 can provide a plurality of home screens. The plurality of home screens may be also called a plurality of standby (or idle) screens. While being changed, any one of the plurality of home screens may be provided to the touch screen 151.

In particular, FIG. 47 is an overview illustrating an example of providing a plurality of home screens. Further, the screen illustrated in FIG. 47 includes an indicator area 75 for indicating a plurality of home screens. A plurality of indicators 76a, 76b, 76c, 76d, and 76e included in the indicator area 75 correspond to the plurality of home screens, respectively.

Further, FIG. 47 illustrates a home screen corresponding to an indicator (the third indicator 76c in FIG. 47) represented as a number among the plurality of indicators 76a, 76b, 76c, 76d, and 76e is currently displayed on the touch screen 151.

Namely, the standby screen currently provided to the touch screen 151 in FIG. 47 is the third home screen among five home screens.

In addition, the first indicator 76a, the second indicator 76b, the fourth indicator 76d, and the fifth indicator 76e indicate home screens not currently displayed on the touch screen 151. Namely, the number of home screens currently not displayed on the touch screen 151 in FIG. 47 is four (4).

Also, when a screen image currently displayed on the touch screen is one of the plurality of home screens and a stroke operation (e.g., a drag operation or a flicking operation) with respect to the polyhedron is performed by more than a predetermined distance or goes outside of a pre-set area, the controller 180 can change the currently displayed home screen into a different home screen. Further, the pre-set area may be an area in which the polyhedron is displayed.

Next, FIGS. 48 and 49 are overviews illustrating performing a function according to a stroke operation with respect to polyhedrons when a plurality of home screens are provided. For example, with reference to FIG. 48, a stroke with respect to the first object group 70 is input on the screen illustrated in FIG. 47. In this instance, when the stroke is input by a distance d2 longer than a predetermined distance d1 (see FIG. 48) or the stroke goes outside of the area in which the first object group 70 is displayed, the controller 180 can perform an operation of changing the currently provided home screen to a different home screen, e.g., the fourth home screen, as shown in FIG. 49.

Controlling Displaying of Unexecutable Object

Meanwhile, there may be an object that cannot be executed among the plurality of overlapping objects in the foregoing exemplary embodiments. For example, when communication with the exterior is not possible due to an unstable or faulty error, an application prerequisite for communication with the exterior may not be executable. Here, an object corresponding to the application prerequisite for communication with the exterior may not be executable.

Also, for example, when a widget for providing state information regarding a certain subject such as a clock widget or a widget providing exchange rate information, and the like is displayed to overlap with objects, the widget providing the state information may deliver information by itself, so it may not be executable.

In addition, the widget that can provide contents by itself may not also be executable. The clock widget or the exchange rate widget may correspond to the widget that can provide contents by itself. Thus, among the plurality of overlapping objects, the controller 180 can display the unexecutable object with the deepest depth level, give predetermined graphic characteristics to the unexecutable object, or display the unexecutable object to have a smaller size than the original size, thus informing the user about the unexecutable object. As the predetermined graphic characteristics may be, for example, the controller 180 can display the unexecutable object in gray color or to be transparent.

Next, FIG. 50 is a flow chart illustrating a method for controlling a mobile terminal according to a fourth embodiment of the present invention. FIG. 1 will also be referred to in this description.

With reference to FIG. 50, the controller 180 displays a plurality of objects in an overlapping manner on the touch screen 151 (S400). Step S400 corresponds to step S300 in the third embodiment of the present invention. When a touch operation with respect to an area in which the plurality of objects are displayed to overlap each other (S410) is received, the controller 180 executes a portion or the entirety of a plurality of applications corresponding to the plurality of overlapping objects according to the type of the received touch operation (S420).

For example, the controller 180 can perform any one of a first operation of executing all of the plurality of applications corresponding to the plurality of overlapping objects and a second operation of executing only an application corresponding to a particular object among the plurality of overlapping objects according to the type of the touch operation in step S410.

A first touch operation as conditions for performing the first operation and a second touch operation as conditions for performing the second operation may also be set to be different in a touch input time with respect to the area in which the plurality of overlapping objects or in the number of touches with respect to the area.

For example, in the state of FIG. 28, when the user touches the area in which the first object 50 is displayed once, the controller 180 executes the weather widget corresponding to the first object 50, and when the user touches the area in which the first object 50 is displayed twice or when the user touches the area in which the first object 50 is displayed for a prolonged duration (or a long touch), the controller 180 executes all of the weather widget, the news widget, and the traffic widget corresponding to the first to third objects 50 to 52, respectively.

Also, the first and second touch operations may be any one of a single touch and a stroke with respect to the area in which the plurality of overlapping objects are displayed. For example, in FIG. 28, when the user inputs a single touch to the area in which the first object 50 is displayed, the controller 180 can execute the weather widget corresponding to the first object 50, and when the user inputs a stroke operation with respect to the area in which the first object 50 is displayed, the controller 180 can execute all of the weather widget, the news widget, and the traffic widget corresponding to the first to third objects 50 to 52, respectively.

Examples of executing all the plurality of objects displayed to overlap each other will now be described. For example, when the first to third objects 50 to 52 correspond to a plurality of different Web pages, a plurality of Web browsers, or a plurality of different Web search engines and a predetermined command (e.g., a long-touch signal input through the area in which the first to third objects 50 are displayed) is received, the controller 180 can simultaneously perform searching through the plurality of Web pages, the plurality of Web browsers, or the plurality of Web search engines.

Also, for example, the first to third objects 50, 51, and 52 may correspond to different broadcast channels preferred by the user. In this instance, when the predetermined command is received, the controller 180 can simultaneously access the plurality of broadcast channels.

Further, the first to third objects 50, 51, and 52 may correspond to different contact items included in a contact book (e.g., a phone book). Also, when the predetermined command is received, the controller 180 can simultaneously transmit the set message to the plurality of items corresponding to the first to third objects 50, 51, and 52.

In addition, when the predetermined command is received, the controller 180 can attempt a conference call to a plurality of counterparts corresponding to the plurality of contact items. Further, the first to third objects 50, 51, and 52 may correspond to the plurality of different types of location information, to a plurality of different social network services (SNSs) or a plurality of instant messages (IMs).

Also, the first to third objects 50, 51, and 52 may be a plurality of received messages or a plurality of absent calls. In this instance, when the predetermined command is received, the controller 180 can display all of the plurality of received messages on the touch screen 151 or display the information regarding all of the plurality of absent calls on the touch screen 151.

Meanwhile, in the foregoing embodiments, the plurality of overlapping objects may correspond to a plurality of different Web pages. In addition, the controller 180 can display the plurality of overlapping objects such that an object corresponding to a set task-completed Web page, among the plurality of different Web pages, to be positioned at the uppermost object. The task may be, for example, Web searching, data downloading, and the like. Also, the controller 180 can display the plurality of overlapping objects such that an object corresponding to a first-accessed Web page among the plurality of different Web pages, to be positioned at the uppermost.

In addition, the mobile terminal, the method for controlling the mobile terminal, and the method for displaying an image of the mobile terminal according to embodiments of the present invention have the following advantages.

First, when a plurality of objects, which may be displayed in various dimensions, overlap with each other, the controller 180 displays the objects so an image distortion does not take place. Second, when the plurality of objects overlap with each other, the controller 180 secures an effective visibility for a user.

Third, when update information related to a particular object among the plurality of overlapping objects is received, the controller 180 can provide information indicating that the update information has been received to the user. Fourth, each of the plurality of objects displayed in an overlap manner can be effectively accessed.

Fifth, because the user can be provided with various user interfaces for executing an application corresponding to at least one of the plurality of objects, the user can conveniently and effectively control the mobile terminal.

The method for providing information of the mobile terminal according to embodiments of the present invention may be recorded in a computer-readable recording medium as a program to be executed in the computer and provided. Further, the method for controlling a mobile terminal and the method for displaying an image of a mobile terminal according to embodiments of the present invention may be executed by software. When executed by software, the elements of the embodiments of the present invention are code segments executing a required operation. The program or the code segments may be stored in a processor-readable medium or may be transmitted by a data signal coupled with a carrier in a transmission medium or a communication network.

The computer-readable recording medium includes any kind of recording device storing data that can be read by a computer system. The computer-readable recording device includes a ROM, a RAM, a CD-ROM, a DVD±ROM, a DVD-RAM, a magnetic tape, a floppy disk, a hard disk, an optical data storage device, and the like. Also, codes which are distributed in computer devices connected by a network and can be read by a computer in a distributed manner are stored and executed in the computer-readable recording medium.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
    a wireless communication unit configured to wirelessly communicate with at least one other terminal;
    a display unit configured to display at least a 2D (two-dimensional) object and a 3D (three-dimensional) object; and
    a controller configured to:
    control the display unit to display a plurality of objects including a first object with a first depth level, a second object with a second depth level, and a third object with a third depth level in an overlapping manner,
        wherein the plurality of objects correspond to applications,
        wherein the third depth level is lower than the second depth level and the second depth level is lower than the first depth level,
    receive first update information of the first object and second update information of the second object through the wireless communication unit,
    change at least one of the first depth level, the second depth level or the third depth level so that the first depth level is lower than the second depth level and the third depth level when the first update information is received,
    change at least one of transparency of the plurality of objects when the second update information is received,
    display the plurality of objects in a rolling manner upon receiving a touch input with respect to an area in which the plurality of objects overlap, and
    display an un-executable object among the plurality of objects to have a smaller size than other objects of the plurality of objects, wherein the un-executable object corresponds to an application prerequisite for communication with the exterior not to be executable.

2. The mobile terminal of claim 1, wherein the controller is further configured to change an original dimension of one of the plurality of objects into a different dimension.

3. The mobile terminal of claim 1, wherein the controller is further configured to change the first depth level of the first object to be deeper than the second depth level or the third depth level.

4. The mobile terminal of claim 1, wherein the controller is further configured to change
    a transparency of one of the plurality of objects.

5. The mobile terminal of claim 1, wherein the controller is further configured to tilt one of the plurality of objects to reduce an amount of overlapping between the plurality of objects.

6. The mobile terminal of claim 1,
    wherein the first or second update information includes at least one of first update information related to version information of the corresponding application and second update information related to contents provided to a user through the corresponding application.

7. The mobile terminal of claim 6, wherein the controller is further configured to change a display position of one of the plurality of objects that has received the first or second update information, or increase a transparency of one of the plurality of objects.

8. The mobile terminal of claim 6, wherein the controller is further configured to display a 3D indicator indicating the first or second update information in an overlapping manner with one of the plurality of objects that has received the first or second update information, and to change the 3D indicator differently according to whether the first or second update information is the first update information or the second update information.

9. The mobile terminal of claim 1, wherein the display unit includes a touch screen, and
    wherein the controller is further configured to unfold at least a portion of the plurality of objects based on a touch action performed on one of the plurality of objects.

10. The mobile terminal of claim 9, wherein when the touch operation is a touch action that touches a first of the unfolded plurality of objects and moves to a second of the unfolded plurality of objects, the controller is further configured to execute an application corresponding to the second of the unfolded plurality of objects.

11. The mobile terminal of claim 9, wherein when the touch action is a touch and drag action, the controller is further configured to unfold the plurality of objects in a direction corresponding to a direction of the touch and drag action, and to unfold only a predetermined number of the plurality of objects based on a length of the touch and drag action.

12. The mobile terminal of claim 9, wherein the controller is further configured to unfold the plurality of objects by rolling the plurality of objects based on a touch action.

13. The mobile terminal of claim 9, wherein the controller is further configured to rotate an unfolded object based on a touch and drag operation performed on the unfolded object.

14. A method of controlling a mobile terminal, the method comprising:
    allowing, via a wireless communication unit included on the mobile terminal, wireless communication with at least one other terminal;
    displaying, via a display unit included on the mobile terminal, a plurality of objects including at least a first object with a first depth level, a second object with a second depth level, and a third object with a third depth level in an overlapping manner, wherein the plurality of objects correspond to applications, and the third depth level is lower than the second depth level and the second depth level is lower than the first depth level;
    receiving, via the wireless communication unit, first update information of the first object and second update information of the second object;
    changing, via a controller included on the mobile terminal, at least one of the first depth level, the second depth level or the third depth level so that the first depth level is lower than the second depth level and the third depth level;
    displaying, via the display unit, the plurality of objects in a rolling manner upon receiving a touch input with respect to an area in which the plurality of objects overlap; and
    displaying, via the display unit, an un-executable object among the plurality of objects to have a smaller size than other objects of the plurality of objects, wherein the un-executable object corresponds to an application prerequisite for communication with the exterior not to be executable.

15. The method of claim 14, wherein the changing step further comprises at least one of:
    changing an original dimension of one of the plurality of objects into a different dimension;
    changing a transparency of one of the plurality of objects; and
    tilting one of the plurality of objects to reduce an amount of overlapping between the plurality of objects.

16. The method of claim 14, wherein the first or second update information includes at least one of first update information related to version information of the corresponding application and second update information related to contents provided to a user through the corresponding application.

17. The method of claim 16, wherein the changing further comprises:
   changing a display position of one of the plurality of objects that has received the first or second update information, or increasing a transparency of one of the plurality of objects.

18. The method of claim 16, wherein the changing step further comprises displaying a 3D indicator indicating the first or second update information in an overlapping manner with one of the plurality of objects that has received the first or second update information, and
   changing the 3D indicator differently according to whether the first or second update information is the first update information or the second update information.

19. The method of claim 14, wherein the display unit includes a touch screen, and
wherein the method further comprises unfolding at least a portion of the plurality of objects based on a touch action performed on one of the plurality of objects.

20. The method of claim 19, wherein when the touch operation is a touch action that touches a first of the plurality of objects and moves to a second of the plurality of objects, the method further comprises executing an application corresponding to the second of the plurality of objects.

21. The method of claim 19, wherein when the touch action is a touch and drag action, the unfolding unfolds the plurality of objects in a direction corresponding to a direction of the touch and drag action, and unfolds only a predetermined number of the plurality of objects based on a length of the touch and drag action.

22. The method of claim 19, further comprising:
   rotating an unfolded object based on a touch and drag operation performed on the unfolded object.

* * * * *